(12) United States Patent
Futa et al.

(10) Patent No.: US 7,434,898 B2
(45) Date of Patent: Oct. 14, 2008

(54) COMPUTER SYSTEM, COMPUTER PROGRAM, AND ADDITION METHOD

(75) Inventors: Yuichi Futa, Osaka (JP); Masato Yamamichi, deceased, late of Ota (JP); by Masami Yamamichi, legal representative, Ota (JP); by Satomi Yamamichi, legal representative, Ota (JP); by Keiko Yamamichi, legal representative, Ota (JP); Motoji Ohmori, Hirakata (JP); Hiroyuki Shizuya, Sendai (JP); Masahiro Mambo, Tsukuba (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 72 days.

(21) Appl. No.: 10/591,846

(22) PCT Filed: Mar. 22, 2005

(86) PCT No.: PCT/JP2005/005136

§ 371 (c)(1),
(2), (4) Date: Sep. 5, 2006

(87) PCT Pub. No.: WO2005/098795

PCT Pub. Date: Oct. 20, 2005

(65) Prior Publication Data

US 2007/0192622 A1    Aug. 16, 2007

(30) Foreign Application Priority Data

Mar. 31, 2004    (JP) .............................. 2004-107778

(51) Int. Cl.
*H04L 9/28* (2006.01)

(52) U.S. Cl. ........................... 380/28; 380/30; 712/221

(58) Field of Classification Search ................... 380/28, 380/29, 30; 712/221
See application file for complete search history.

(56) References Cited

U.S. PATENT DOCUMENTS 5,073,935 A * 12/1991 Pastor .......................... 380/30

(Continued)

FOREIGN PATENT DOCUMENTS

JP    3402441    5/2003

(Continued)

OTHER PUBLICATIONS

Sato et al., "Program Obfuscation by Coding Data and Its Operation", The Institute of Electronics, Information and Communication Engineers, Technical Report of IEICE, vol. 102, No. 743, pp. 13-18, Mar. 19, 2003.

(Continued)

*Primary Examiner*—William M Treat
(74) *Attorney, Agent, or Firm*—Wenderoth, Lind & Ponack L.L.P.

(57) ABSTRACT

A computer system that makes it difficult to analyze the content of a calculation. In the computer system, a power operation unit performs the following operations using the input data "a" and "b": $g_a = g^a \bmod n$, $g_b = g^b \bmod n$. Next, in the computer system, a multiplication unit performs the following calculation using $g_a$ and $g_b$: $g_{ab} = g_a \times g_b \bmod n$. Next, in the computer system, a discrete logarithm calculation unit calculates $c_i \bmod p_i - 1$ to satisfy $g_{ab} = g^{c_i} \bmod p_i$ (i=1, 2, 3, ..., k). Next, in the computer system, a CRT unit calculates "c" to satisfy $c_i = c \bmod p_i - 1$ (i=1, 2, 3, ..., k) using the Chinese remainder theorem CRT.

10 Claims, 19 Drawing Sheets

U.S. PATENT DOCUMENTS

| | | | |
|---|---|---|---|
| 6,480,605 B1 | 11/2002 | Uchiyama et al. | |
| 6,594,761 B1 | 7/2003 | Chow et al. | |
| 6,668,325 B1 | 12/2003 | Collberg et al. | |
| 7,164,765 B2 * | 1/2007 | Nishioka et al. | 380/30 |
| 2003/0221121 A1 | 11/2003 | Chow et al. | |

FOREIGN PATENT DOCUMENTS

| | | |
|---|---|---|
| JP | 2005-049925 | 2/2005 |
| WO | 99/01815 | 1/1999 |
| WO | 00/077597 | 12/2000 |

OTHER PUBLICATIONS

Noboru Kunihiro and Kenji Koyama, "Two Discrete Log Algorithms for Super-Anomalous Elliptic Curves", SCIS'99, 1999, pp. 869-874.

* cited by examiner

FIG. 10
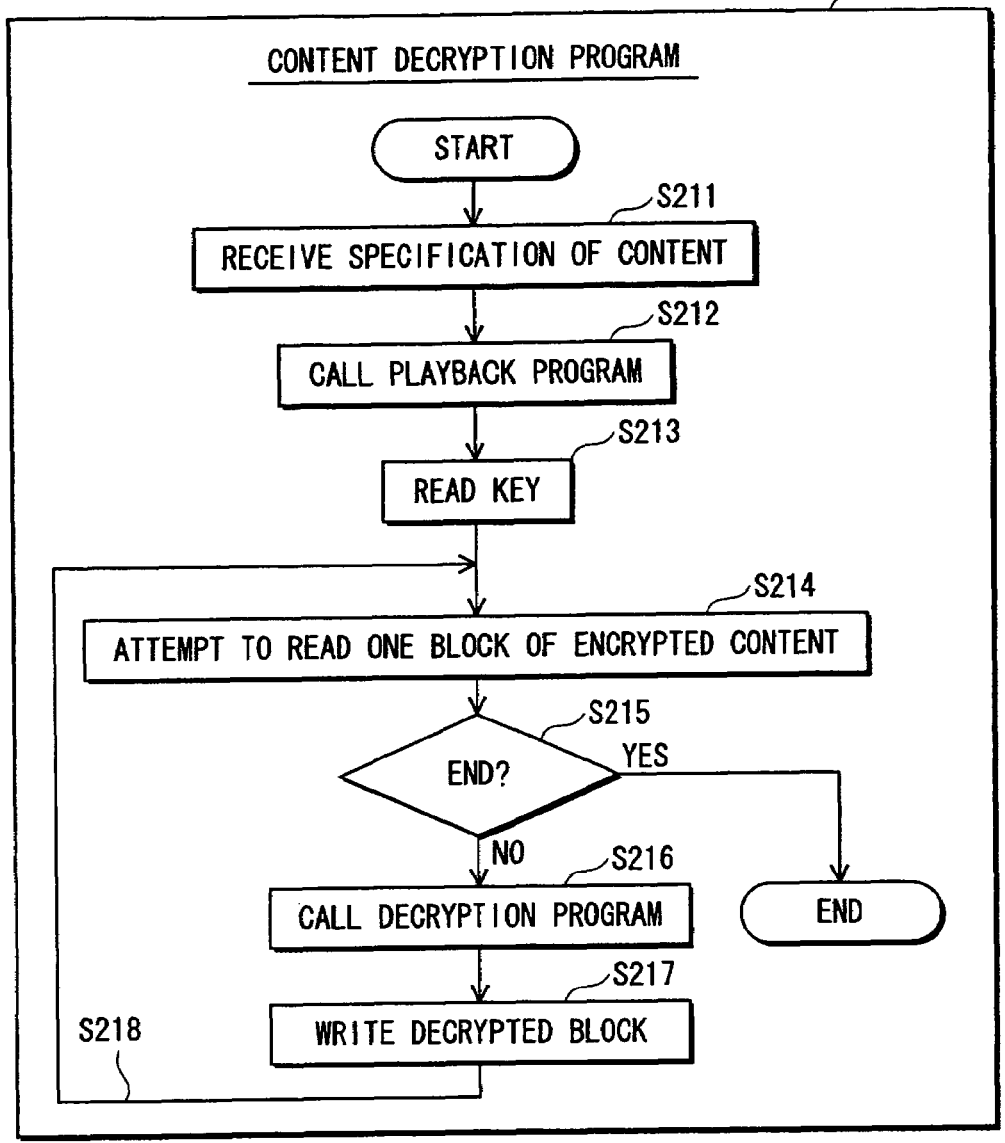
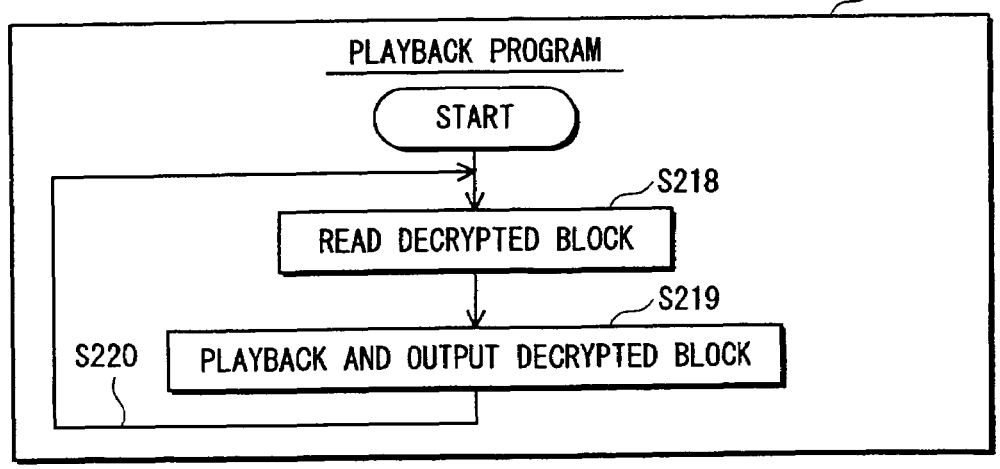

COMPUTER SYSTEM, COMPUTER PROGRAM, AND ADDITION METHOD

BACKGROUND OF THE INVENTION

1. Field of the Invention

The present invention relates to tamper-resistant software technology that makes it difficult to analyze a computer program.

2. Description of the Related Art

In recent years, the use of encryption programs (encryption software) in computer systems containing processors that operate in accordance with computer programs has become common in applications such as communicating secret information and authenticating communication partners.

In such applications, unauthorized use may occur if software containing keys, encryption algorithms, and the like is installed in its original state on a computer system and the installed software is analyzed. To solve this problem, Patent Document 1 discloses a technology that converts operations and data fields so as to make it difficult to infer original operations and data.

Suppose, for example, that there is an addition program that performs an addition on input data a and b, and outputs the result a+b.

The integers $k_1$ and $k_2$ are stored in advance and used to convert the input data a and b to $t_a = k_1 \times a + k_2$ and $t_b = k_1 \times b + k_2$, respectively. Note that "×" is an operator denoting a multiplication.

Next, $t_{ab} = t_a + t_b$ is calculated from $t_a$ and $t_b$.

Also, $c = (t_{ab} - 2k_2)/k_1$ is calculated from $t_{ab}$.

Next, an operation result c is output.

The above process gives $$t_{ab} = t_a + t_b$$
$$= k_1 \times a + k_2 + k_1 \times b + k_2$$
$$= k_1 \times (a+b) + 2k_2 \text{ which gives}$$

$$(t_{ab} - 2k_2)/k_1 = a + b$$

Thus c=a+b, and the result of the addition of a and b is obtained by the addition program.

Patent Document 1: U.S. Pat. No. 6,594,761

Patent Document 2: Japanese Patent Application No. 3402441

Patent Document 3: Japanese Laid-open Patent Application 2760799

Non-patent Document 1: Tatsuaki OKAMOTO, Hirosuke YAMAMOTO "Gendai Ango" (Modern Cryptography), Sangyotosho (1997)

Non-patent Document 2: Henri Cohen, "A Course in Computational Algebraic Number Theory", GTM 138, Springer-Verlag, 1993, pp. 19-20

Non-patent Document 3: I. Blake, G. Seroussi and N. Smart, "Elliptic Curves in Cryptography", CAMBRIDGE UNITVERSITY PRESS, 1999

Non-patent Document 4: N. Kunihiro and K. Koyama, "Two Discrete Log Algorithms for Super-Anomalous Elliptic Curves", SCIS '99, 1999, pp. 869-874

BRIEF SUMMARY OF THE INVENTION

Problem that Present Invention Aims to Solve

A problem with the method of the conventional example is that there is a risk that the operation before conversion will be inferred to be addition. This is because the operation in the domain after conversion is addition, and is therefore of the same type as the operation before the conversion. Thus, if the sections of the program performing the addition are discovered by a person attempting to analyze the program, there is a danger that the code around these sections will be intensively analyzed to reveal the nature of the conversion used. An operation other than addition should therefore be used to ensure, as far as possible, that the true nature of the operation before conversion is not discovered.

An object of the present invention is to provide a computer system, a program, an addition method, and a recording medium which make it more difficult to analyze the content of operations.

Means to Solve the Problem

In order to solve the above problem, the present invention is a computer system for adding two or more integers, including: a memory unit operable to store a program composed of a plurality of instructions; and a processor operable to fetch each instruction in turn from the program stored in the memory unit, and decode and execute each fetched instruction. The program includes a conversion instruction set to have the processor generate elements belonging to a group G by implementing a power operation in the group G using each integer, an operation instruction set to have the processor generate an operation value by implementing a basic operation other than addition using all the generated elements, and an inverse conversion instruction set to have the processor generate a sum value of the integers by implementing, in the group G or a proper subgroup S of the group G, an inverse power operation on the operation value.

EFFECTS OF THE INVENTION

With this construction, it is possible to conceal the operation itself as well as the values used in the operation.

The computer system may securely and reliably manipulate target information, the program may further include a security instruction set to have the processor implement security processing on the target information, and the security instruction set may have the processor implement an addition operation using the conversion instruction set, the operation instruction set, and the inverse conversion instruction set.

Here, the group G may be a multiplicative group of an integer residue ring, the conversion instruction set may have the processor implement an exponentiation to each of the integers, and the operation instruction set may have the processor implement a multiplication of the elements.

With this construction, the operation performed after the conversion can be concealed since it is a multiplication rather than an addition.

Here, the group G may be a multiplicative group of Z/nZ for which $n = p^m \times q$, where p and q are primes and m is a positive integer, the conversion instruction set may have the processor implement exponentiations to each of the integers, and the operation instruction set may have the processor implement a multiplication of the elements.

With this construction, the operation performed after the conversion can be concealed since it is multiplication rather than an addition.

Here, the subgroup S may be an anomalous elliptic curve group, the conversion instruction set may have the processor implement a multiplication on the elliptic curve using each integer, and the operation instruction set may have the processor implement an addition of the elements on the elliptic curve. Moreover, the group G may be a direct product of two anomalous elliptic curve groups, the conversion instruction set may have the processor implement a multiplication on the elliptic curve using each integer, and the operation instruction set may have the processor implement an addition of the generated elements on the elliptic curve.

With this construction, the operation performed after the conversion can be concealed since it is addition on an elliptic curve, rather than an addition of integers.

Here, the inverse conversion instruction set may include a reduction portion to have the processor reduce each element belonging to the group G to an element belonging to the subgroup S.

With this construction, the operation by the inverse conversion instruction set is easily carried out.

The computer system may encrypt or decrypt target information based on key information. In this case, the security instruction set may have the processor encrypt or decrypt the target information based on the key information, the encryption and decryption being performed using the addition operation to add the key information or second key information obtained from the key information, to the target information or to second target information obtained from the target information, and in the addition operation, the conversion instruction set, the operation instruction set, and the inverse conversion instruction set may be used to add the key information or the second key information, to the target information or to the second target information.

With this construction, the values and operations used in the additions which relate to encryption or decryption can be concealed.

The computer system may implement a digital signature or digital signature verification on the target information based on key information. Here, the security instruction set may implement the digital signature or digital signature verification on the target information based on the key information, making use of the addition operation to add the key information or second key information obtained from the key information, to the target information or to second target information obtained from the target information, and in the addition operation, the conversion instruction set, the operation instruction set and the inverse conversion instruction set may be used to add the key information or the second key information to the target information or to the second target information.

With this construction, the values and operations used in the adding related to the digital signature or digital signature verification can be concealed.

As described above, the construction of the present invention is advantageous as it enables concealment of the operation itself as well as the values used in the operation.

BRIEF DESCRIPTION OF THE DRAWINGS

FIG. 10 is a flow-chart describing a content decryption program 232;

DETAILED DESCRIPTION OF THE INVENTION

1. Content Transmission System 10

The following describes a content transmission system 10 as a first embodiment of the present invention.

Construction of Content Transmission System 10

Figure 1:
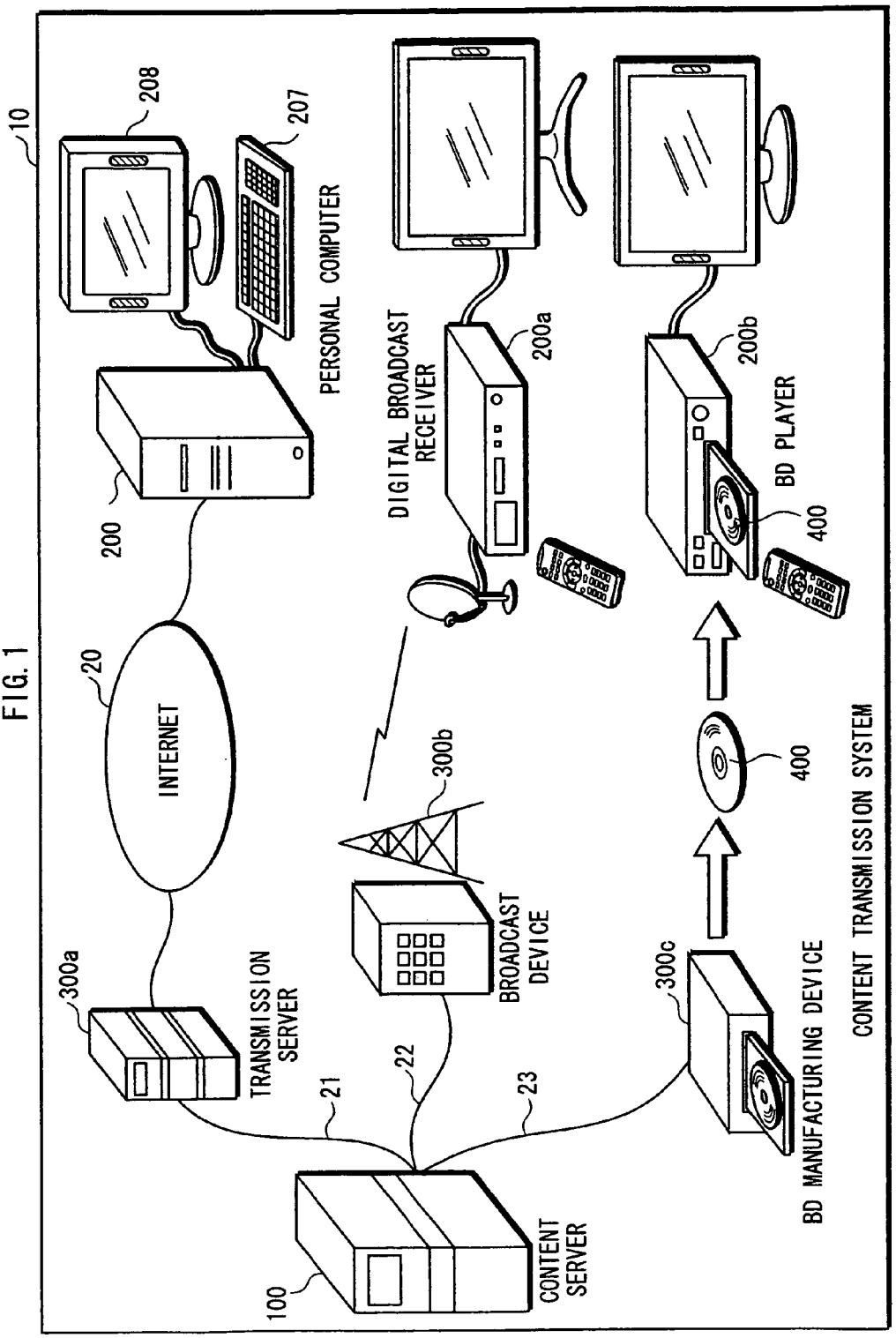
FIG. 1 shows a construction of a content transmission system 10.

The content transmission system 10 is constructed from a content server 100, a transmission server 300a, a broadcast device 300b, a BD manufacturing device 300c, a personal computer 200, a digital broadcast receiver 200a, and a BD player 200b, as shown in FIG. 1.

The content server 100 stores movie content composed of video and audio data, generates encrypted content by encrypting the stored content in accordance with a request from the transmission server 300a, and transmits the generated encrypted content to the transmission sever 300a which is connected via an exclusive line 21. The transmission server 300a receives the encrypted content, and transmits the encrypted content to the personal computer 200, to which the transmission server 200 is connected, via the Internet 20. The personal computer 200 receives the encrypted content, generates decrypted content by decrypting the received encrypted content, and outputs video and sound by playing back the generated decrypted content.

The content server 100 similarly generates encrypted content in accordance with a request from the broadcast device 300b, and transmits the generated encrypted content to the broadcast device 300b which is connected via an private line 22. The broadcast device 300b receives the encrypted content, broadcasts the received encrypted content on a carrier wave. The digital broadcast receiver 200a receives the broadcast wave, extracts the encrypted content from the received broadcast wave, generates decrypted content by decrypting the extracted encrypted content, and outputs video and sound by playing back the generated decrypted content.

The content server 100 similarly generates encrypted content in accordance with a request from the BD manufacturing device 300c, and transmits the generated encrypted content to the BD manufacturing device 300c which is connected via a private line 23. The BD manufacturing device 300c receives the encrypted content, and writes the received encrypted content in a recording medium 400. The recording medium 400 with the encrypted content written therein is marketed and sold to a user. When the user loads the recording medium 400, the BD player 200b reads the encrypted content from the recording medium 400, generates decrypted content by decrypting the read encrypted content, and outputs video and sound by playing back the generated decrypted content.

1.2 Content Server 100

Figure 2:
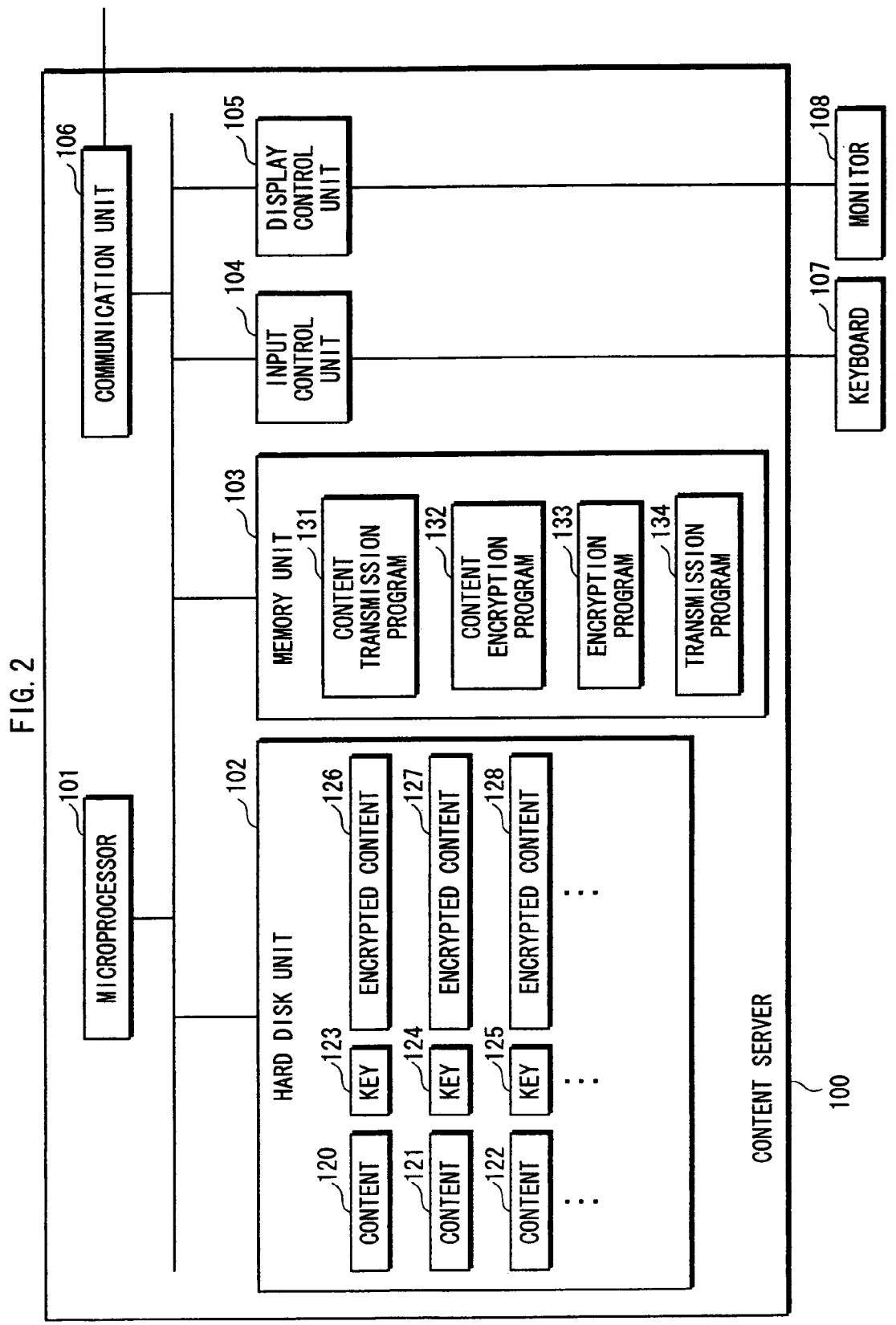
FIG. 2 is a block diagram showing a construction of a content server 100.

The content server 100 is a computer system constructed from a microprocessor 101, a hard disk unit 102, a memory unit 103, an input control unit 104, a display control unit 105, a communication unit 106, and the like, as shown in FIG. 2. The input control unit 104 and the display control unit 105 are connected to a keyboard 107 and a monitor 108, respectively. The communication unit 106 is connected to the transmission server 300a, the broadcast device 300b and the BD manufacturing device 300c via the exclusive lines 21, 22 and 23, respectively.

The hard disk unit 102 and the memory unit 103 have various programs stored therein, and the content server 100 achieves a portion of its functions by the microprocessor 101 operating according to the programs.

(1) Hard Disk Unit 102

The hard disk unit 102 stores content 120, content 121, content 122, . . . , key 123, key 124, and key 125, . . . , as shown in FIG. 2, along with other programs not depicted. The hard disk unit 102 is provided with regions for storing encrypted content 126, encrypted content 127, encrypted content 128 . . . .

The content 120, content 121, content 122 . . . , correspond to the key 123, key 124, key 125, . . . , respectively, and further correspond to the encrypted content 126, encrypted content 127, encrypted content 128, . . . respectively.

Each of the content 120, content 121, content 122, . . . , is data consisting of video and audio data which have been compression coded at high efficiency.

The key 123, key 124, key 125, . . . are encryption keys used for generating the encrypted content 126, encrypted content 127, and encrypted content 128 by applying an encryption algorithm to the content 120, content 121, content 122 . . . . Each of the key 123, key 124, and key 125 is 64 bits in length. The encryption algorithm is described in a later section.

The encrypted content 126, encrypted content 127, encrypted content 128 . . . are the encrypted data generated by applying the encryption algorithm to the content 120, content 121, content 122 . . . respectively.

(2) Memory Unit 103

The memory unit 103 stores a content transmission program 131, content encryption program 132, encryption program 133, and transmission program 134, as shown in FIG. 2, along with other programs not depicted. Each of these programs is composed of a combination of instruction codes in machine language format. The machine language format can be decoded and executed by the microprocessor 101.

The following is a description of the content of each program. To ensure that the particulars of each program are easily understand able, that content of each program is represented using a flow-chart rather than instructions in machine language format.

(a) Content Transmission Program 131

Figure 3:
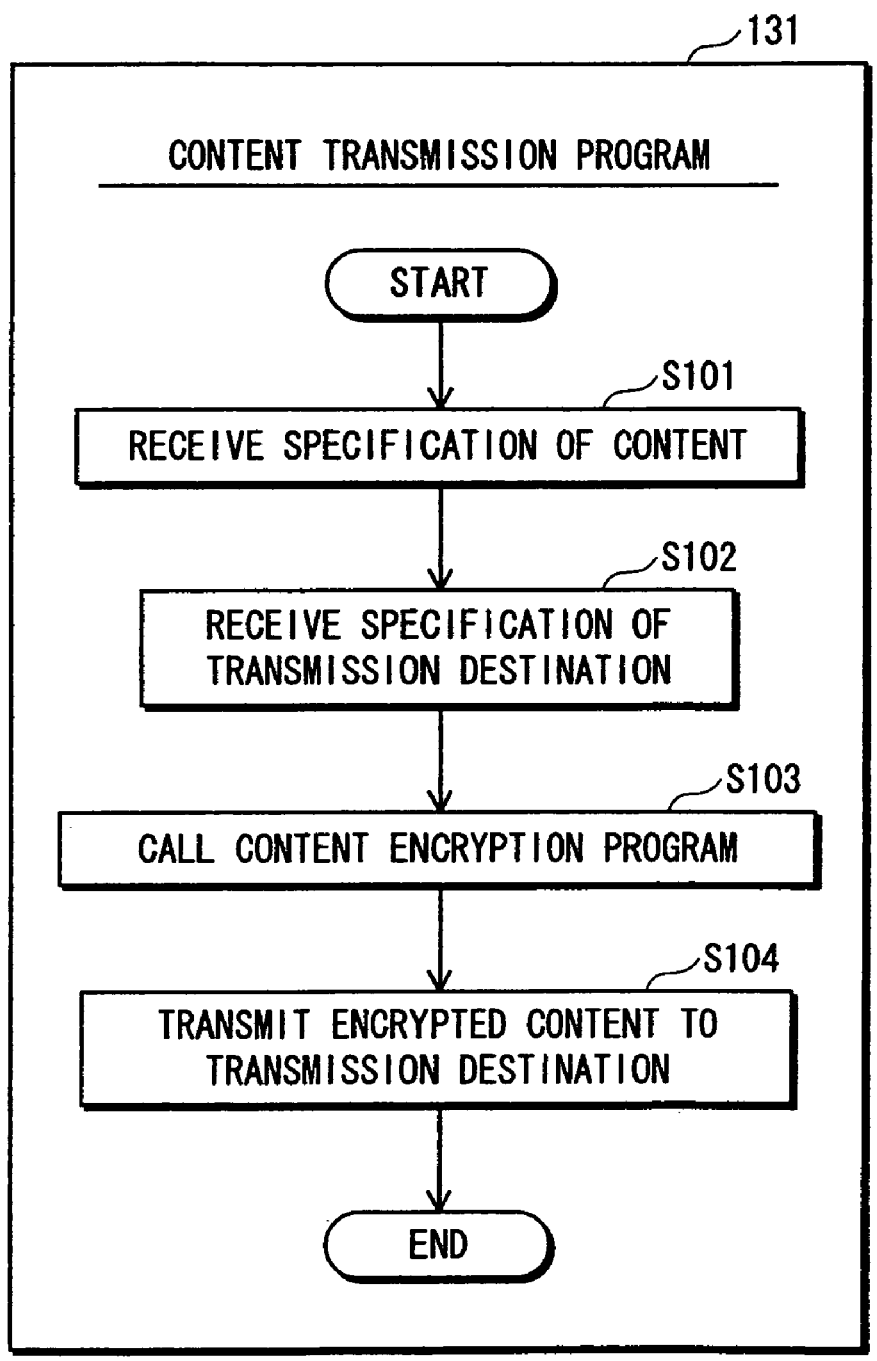
FIG. 3 is a flow-chart describing a content transmission program 131.

The content transmission program 131 is composed of instruction code sets S101, S102, S103, and S104, which are arranged in the stated order in the content transmission program 131, as shown in FIG. 3. Each instruction code set includes one or more instruction codes.

The instruction code set S101 includes a plurality of instruction codes that indicates to receive a specification of content from an administrator of the content server 100, or to receive of a specification of content from a transmission destination device for the content.

The instruction code set S102 includes a plurality of instruction codes that indicates to receive a specification of the transmission destination device for the content.

The instruction code set S103 includes a plurality of instruction codes that indicates to specify content indicated by the accepted or received specification, to call the content encryption program 132, and then to write, as the encrypted content 126, encrypted content generated by the content encryption program 132 in the hard disk unit 102.

The instruction code set S104 includes a plurality of instruction codes that indicates to specify the transmission destination device of the received specification and the encrypted content generated and written in hard disk unit 102, and to call the transmission program 134. By executing the instruction code set S104, the generated encrypted content is transmitted to the specified transmission destination device.

(b) Content Encryption Program 132

Figure 4:
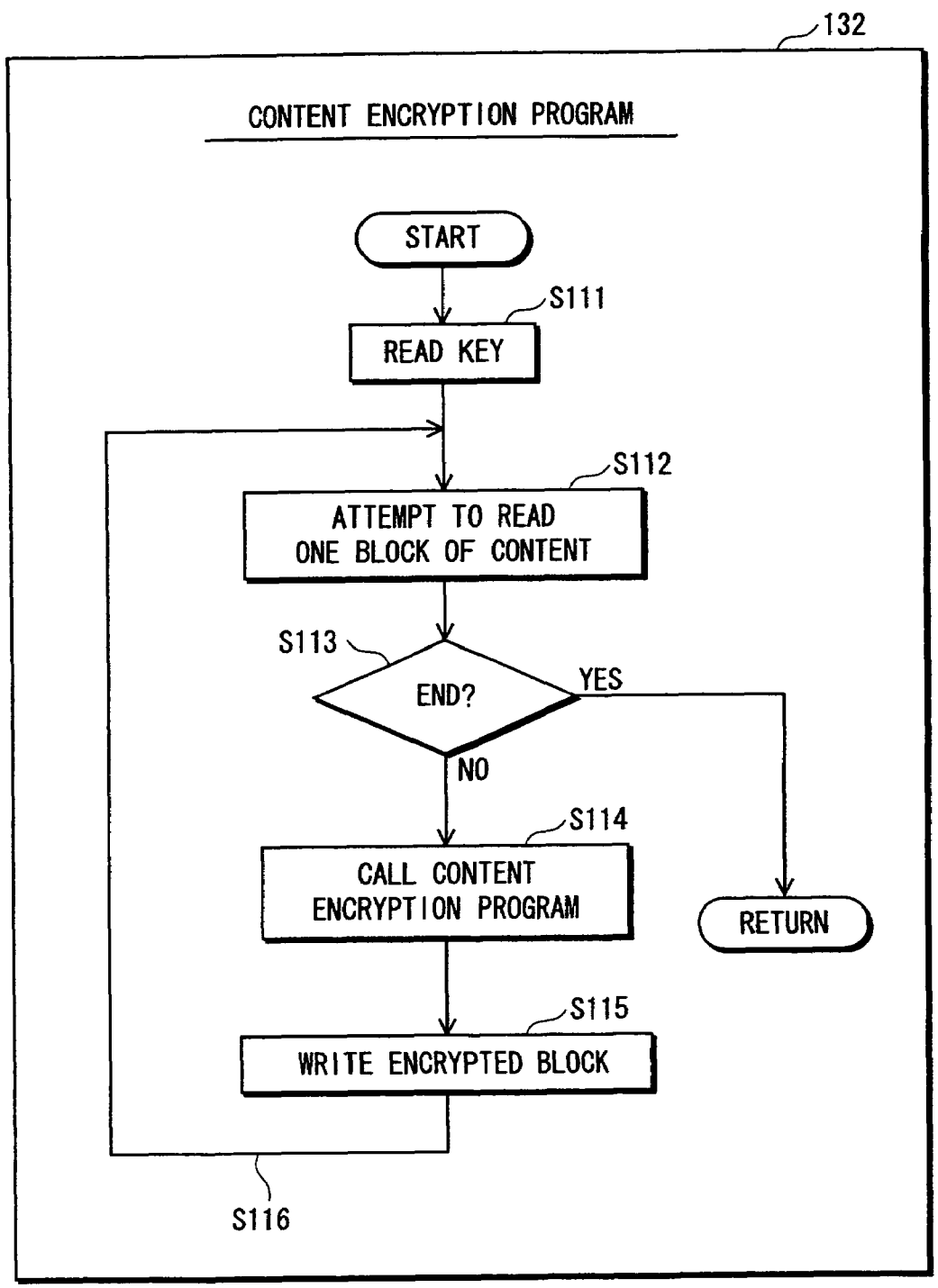
FIG. 4 is a flow-chart describing a content encryption program 132.

The content encryption program 132 is composed of instruction code sets S111, S112, S113, S114, S115, and S116, and these instruction code sets are arranged in the stated order in the content encryption program 132, as shown in FIG. 4. Each instruction code set includes one or more instruction codes.

The instruction code set S111 includes a plurality of instruction codes that indicates to assign "−64" as an initial value to a read point. The read point indicates a data position in bits in the specified content. The instruction codes also indicate to read a key corresponding to the specified content from the hard disk unit 102. The read point with the initial value of "−64" indicates a position outside the content. The initial value of "−64" is assigned to the read point so that when the later-described instruction code set S122 is executed for the first time the read point indicates a position at the head of the content. In the first execution of the later-described instruction code set S122, 64 bits are added to the read point, and the read point becomes "0", which indicates the head of the content.

The instruction code set S112 includes a plurality of instruction codes that indicates to add 64 bits to the read point, and then to read a block of data starting at the position in the content indicated by the resulting read point. The plurality of instruction codes further indicates to read the block of data from the position indicated by the read point if the position lies within the content, and to output an end code indicating that reading of the blocks has ended if the position indicated by the read point lies outside the content. Here, one block is data with a bit length of 64.

The instruction code set S113 includes a plurality of instruction codes that indicates to end processing by the content encryption program 132 if the end code is outputted from the instruction code set S112. The plurality of instruction codes further indicates to pass control to the next instruction code set S114 if the end code is not outputted.

The instruction code set S114 includes a plurality of instruction codes that indicates to call the encryption program 133 with the read key and the read first block.

The instruction code set S115 includes a plurality of instruction codes that indicates to write the single encrypted block generated by the encryption program 133 to the hard disk unit 102 as a portion of the encrypted content 126.

The instruction code set S116 includes an instruction code that indicates to pass the control to the instruction code set S112.

(c) Encryption Program 133

Figure 5:
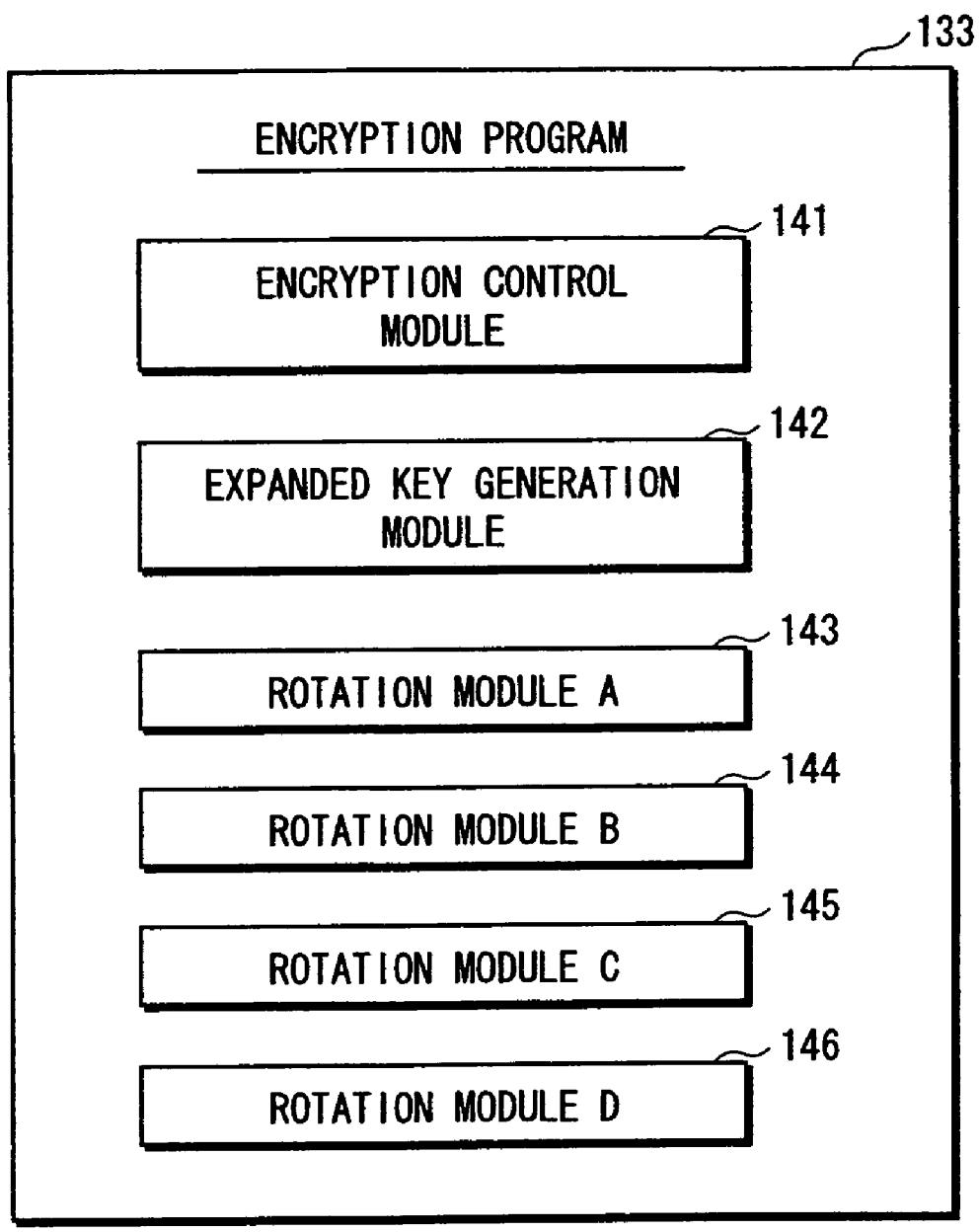
FIG. 5 shows the structure of an encryption program 133.

The encryption program 133 is composed of an encryption control module 141, an expanded key generation module 142, a rotation module A 143, a rotation module B 144, a rotation module C 145, and a rotation module D 146, as shown in FIG. 5.

Each module is a program composed of a combination of instruction codes in a machine language format. The machine language format can be decoded and executed by the microprocessor 101.

Expanded Key Generation Module 142

The expanded key generation module 142 includes a plurality of instruction codes for reception of a 64-bit key K from a caller program, generation of 8 expanded keys K1, K2, K3, ...,K8 using the received key K, and output of the 8 generated expanded keys K1, K2, K3, ..., K8 to the caller program.

Note that since description of the method for generating the expanded keys is carried in Patent Document 3, it is omitted here.

Rotation Module A 143

The rotation module A 143 includes a plurality of instruction codes that indicate to (i) receive 32-bit data X from the caller program, (ii) perform an operation Rot2(X)+X+1 with respect to data X, and (iii) output the result of the operation to the caller program.

Rot2(X) indicates a 2-bit cyclic shift to the left of the 32-bit data X. A 2-bit cyclic shift to the left of the 32-bit data X refers to dividing the data X into the 2 most significant bits X1 and the least significant bits X2, shifting X2 to the 30 most significant bits of the data X, and shifting X1 to the 2 least significant bits.

Rotation Module B 144

The rotation module B 144 includes a plurality of instruction codes that indicate to (i) receive 32-bit data X from the caller program, (ii) perform an operation Rot4(X) XOR X with respect to data X, and (iii) output the result of the operation to the caller program.

Rot4(X) indicates a 4-bit cyclic shift to the left of data X and XOR indicates an exclusive OR operation. The 4-bit cyclic shift to the left of the 32-bit data X refers to dividing the data X into the 4 most significant bits X1 and the 28 least significant bits X2, shifting X2 to the 28 most significant bits of the data X, and shifting X1 to the 4 least significant bits.

Rotation Module C 145

The rotation module C 145 includes a plurality of instruction codes that indicate to (i) receive of 32-bit data X from the caller program, (ii) perform the operation Rot8(X) XOR X with respect to data X, and (iii) output the result of the operation to the caller program.

Rot8(X) indicates an 8-bit cyclic shift to the left of data X. An 8-bit cyclic shift to the left of the 32-bit data X refers to dividing the data X into the 8 most significant bits X1 and the 24 least significant bits X2, shifting X2 to the 24 most significant bits of the data X, and shifting X1 to the 8 least significant bits.

Rotation Module D 146

The rotation module D 146 includes a plurality of instruction codes that indicate to (i) receive 32-bit data X and 32-bit data Y from the caller program, (ii) perform the operation Rot16(X)+(X AND Y) with respect to the data X and the data Y, and (iii) output the result of the operation to the caller program.

Rot16(X) indicates an 16-bit cyclic shift to the left of data X while AND indicates a logical product. A 16-bit cyclic shift to the left of the 32-bit data X refers to dividing the data X into the 16 most significant bits X1 and the 16 least significant bits X2, shifting X2 to the 16 most significant bits of the data X, and shifting X1 to the 16 least significant bits.

Encryption Control Module 141

Figure 6:
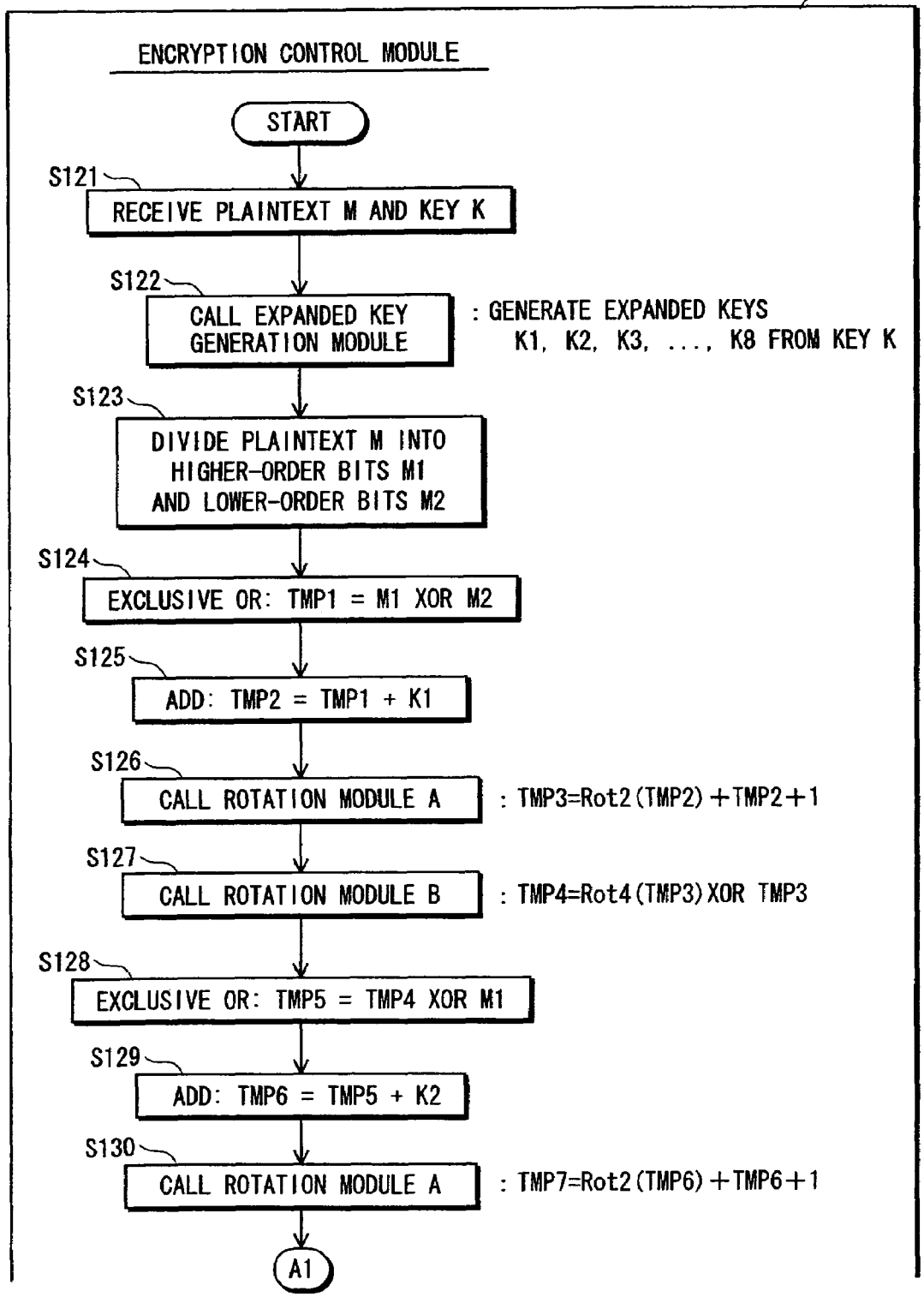
FIG. 6 is a flow-chart describing the content of an encryption control module 141 (continued in FIG. 7)
Figure 7:
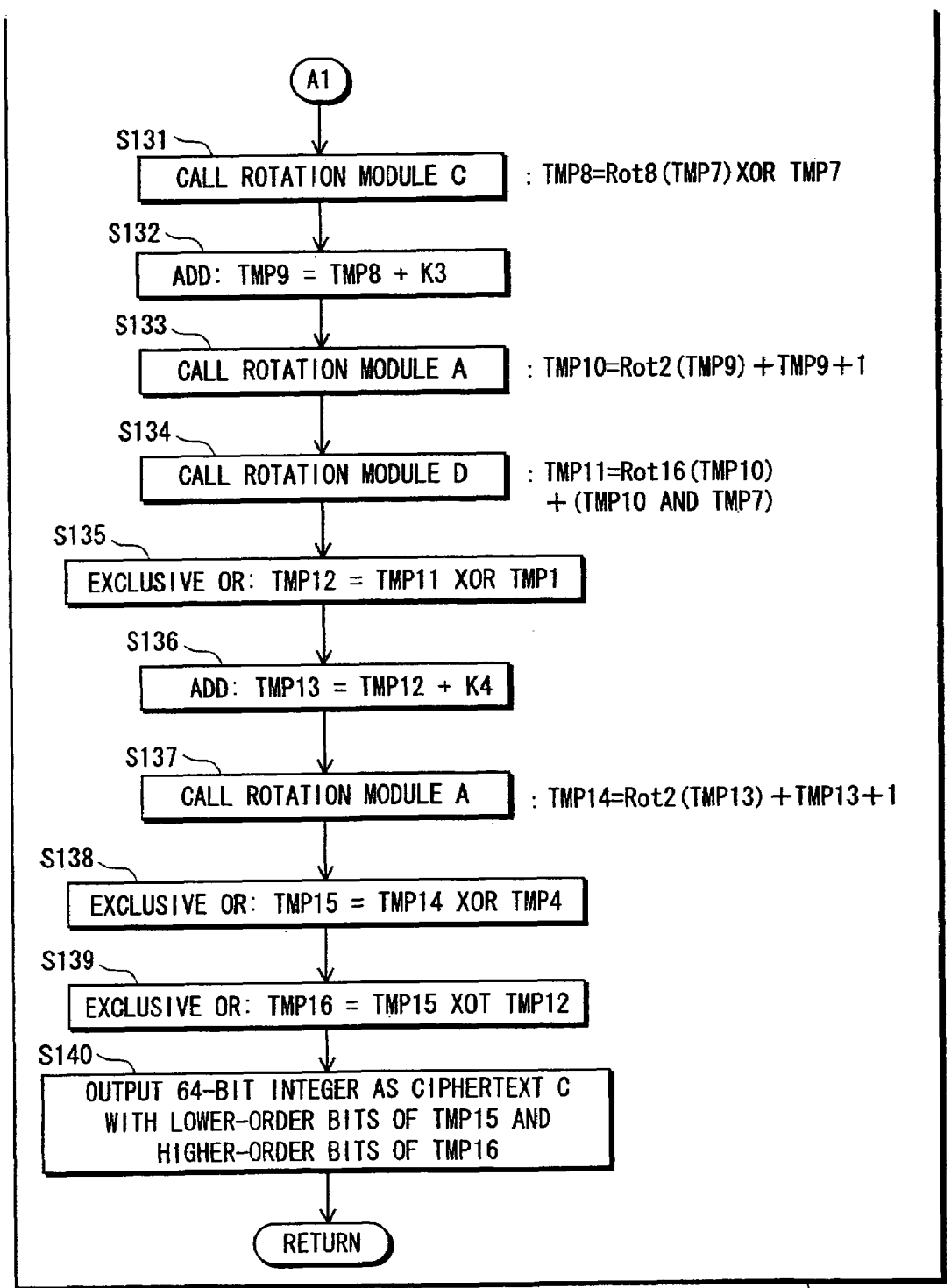
FIG. 7 is a flow-chart describing the content of the encryption control module 141 (continuation of flow-chart from FIG. 6)

The encryption control module 141 includes instruction sets S121 to S140 arranged in the stated order in the encryption control module 141, as shown in FIG. 6 and FIG. 7. Each instruction code set includes one or more instruction codes.

The instruction code set S121 includes a plurality of instruction codes that indicates to receive a single block of plaintext M and the key K from the caller program which called the encryption module 141. Note that one block is data with a bit length of 64.

The instruction code set S122 includes a plurality of instruction codes that indicates to call the expanded key generation module 142 with the received key K. Execution of the instruction code set S122 results in the generation of the 8 expanded keys K1, K2, K3, ...,K8.

The instruction code set S123 includes an instruction code which defines data M1 and an instruction code which defines data M2. The data M1 is the 32 most significant bits of the received plaintext M, and the data M2 is the 32 least significant bits of the received plaintext M.

The instruction code set S124 includes a plurality of instruction codes that indicates to perform an XOR operation on the data M1 and the data M2, and to store the result in a variable TMP1.

$TMP1=M1 \text{ XOR } M2$

The instruction code set S125 includes a plurality of instruction codes that indicates to perform addition of the variable TMP1 and the expanded key K1, and to store the result of the operation in a variable TMP2.

$TMP2=TMP1+K1$

The instruction code set S126 includes a plurality of instruction codes that indicates to call of the rotational module A143 with the variable TMP2, and to store the result of the operation in a variable TMP3.

$TMP3=Rot2(TMP2)+TMP2+1$

The instruction code set S127 includes a plurality of instruction codes that indicates to call the rotational module B144 with the variable TMP3, and to store the result of the operation in a variable TMP4.

$TMP4=Rot4(TMP3) \text{ XOR } TMP3$

The instruction code set S128 includes a plurality of instruction codes that indicates to perform an XOR operation on the variable TMP4 and the data M1, and to store the result in a variable TMP5.

$TMP5=TMP4 \text{ XOR } M1$

The instruction code set S129 includes a plurality of instruction codes that indicates to take a sum of the variable TMP5 and the expanded key K2, and to store the result of the operation in a variable TMP6.

$$TMP6=TMP5+K2$$

The instruction code set S130 includes a plurality of instruction codes that indicates to call the rotation module A143 with the variable TMP6, and to store the result of the operation in a variable TMP7.

$$TMP7=Rot2(TMP6)+TMP6+1$$

The instruction code set S131 includes a plurality of instruction codes that indicate to call the rotation module C145 with the variable TMP7, and to store the result of the operation in a variable TMP8.

$$TMP8=Rot8(TMP7) \text{ XOR } TMP7$$

The instruction code set S132 includes a plurality of instruction codes that indicates to add the variable TMP8 and the expanded key K3, and to store the result of the operation in a variable TMP9.

$$TMP9=TMP8+K3$$

The instruction code set S133 includes a plurality of instruction codes that indicates to call the rotation module A143 with the variable TMP9, and to store the result of the operation in a variable TMP10.

$$TMP10=Rot2(TMP9)+TMP9+1$$

The instruction code set S134 includes a plurality of instruction codes that indicates to call the rotation module D146 with the variable TMP7 and the variable TMP10, and to store the result of the operation in a variable TMP11.

$$TMP11=Rot16(TMP10)+(TMP10 \text{ AND } TMP7)$$

The instruction code set S135 includes a plurality of instruction codes that indicates to perform an XOR operation on the variable TMP11 and the variable TMP1, and to store the result of the operation in a variable TMP12.

$$TMP12=TMP11 \text{ XOR } TMP1$$

The instruction code set S136 includes a plurality of instruction codes that indicates to add the variable TMP12 and the expanded key K4, and to store the result of the operation in a variable TMP13.

$$TMP13=TMP12+K4$$

The instruction code set 137 includes a plurality of instruction codes that indicates to call the rotation module A143 with the variable TMP13, and to store the result of the operation in a variable TMP14.

$$TMP14=Rot2(TMP13)+TMP13+1$$

The instruction code set S138 includes a plurality of instruction codes that indicates to perform an XOR operation on the variable TMP14 and the variable TMP4, and to store the result of the operation in a variable TMP15.

$$TMP15=TMP14 \text{ XOR } TMP4$$

The instruction code set S139 includes a plurality of instruction codes that indicates to perform an XOR operation on the variable TMP15 and the variable TMP12, and to store the result of the operation in a variable TMP16.

$$TMP16=TMP15 \text{ XOR } TMP12$$

The instruction code set S140 includes a plurality of instruction codes that indicate to output a 64-bit integer having the variable TMP15 as its 32 most significant bits and the variable TMP16 as its least significant bits, as a ciphertext C, to the caller program Transmission Program 134

The transmission program 134 (not depicted) is composed of a plurality of instruction codes arranged in order, and includes a plurality of instruction codes that indicates to receive the specification of data and the specification of the transmission destination device from the caller program, and to control the communication unit 106 to cause the specified data to be transmitted to the specified transmission destination device.

1.3 Personal Computer 200

Figure 8:
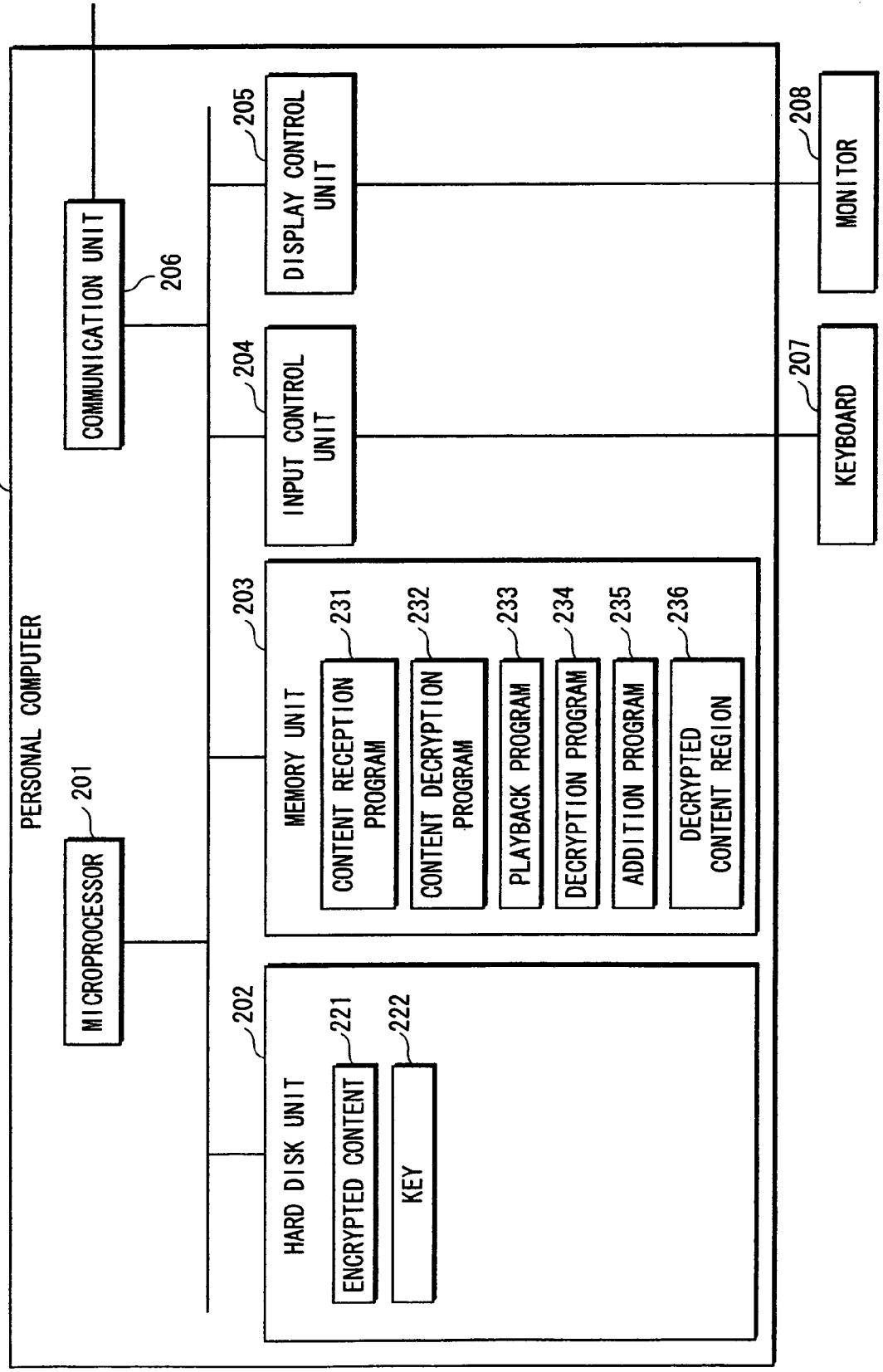
FIG. 8 shows the construction of a personal computer 200.

The personal computer 200 is composed of a microprocessor 201, a hard disk unit 202, a memory unit 203, an input control unit 204, a display control unit 205, a communication unit 206, and the like, as shown in FIG. 8. The input control unit 204 and the display control unit 205 are connected to a keyboard 207 and a monitor 208, respectively. Further, the communication unit 706 is connected to the Internet 20.

The hard disk unit 202 and the memory unit 203 have various programs stored therein, and the personal computer 200 achieves a portion of its functions as a result of the microprocessor 201 operating in accordance with the programs.

Note that descriptions of the digital broadcast receiver 200a and the BD player 200b have been omitted since the devices have constructions similar to that of the personal computer 200.

Hard Disk Unit 202

The hard disk unit 202 stores the key 222 and is provided with a region for storing encrypted content 221, as shown in FIG. 8. The encrypted content 221 corresponds to the key 222.

The encrypted content 221 and the key 222 are respectively identical to the encrypted content 126 and the key 123 stored on the hard disk 102 of the content server 100.

(2) Memory Unit 203

The memory unit 203 stores content reception program 231, content decryption program 232, playback program 233, decryption program 234 and addition program 235, as shown in FIG. 8. Moreover, the memory unit 203 includes a decrypted content region 236. Each of these programs is a program composed of a combination of instruction codes in machine language format. The machine language format can be decoded and executed by the microprocessor 201.

The encrypted content is decrypted, and the generated decrypted content is temporarily written in the decrypted content region 236.

The following is a description of the details of the various program. To make the details of each program easily understand able, each program is represented using a flow-chart rather than instructions in machine language format.

(a) Content Reception Program 231

Figure 9:
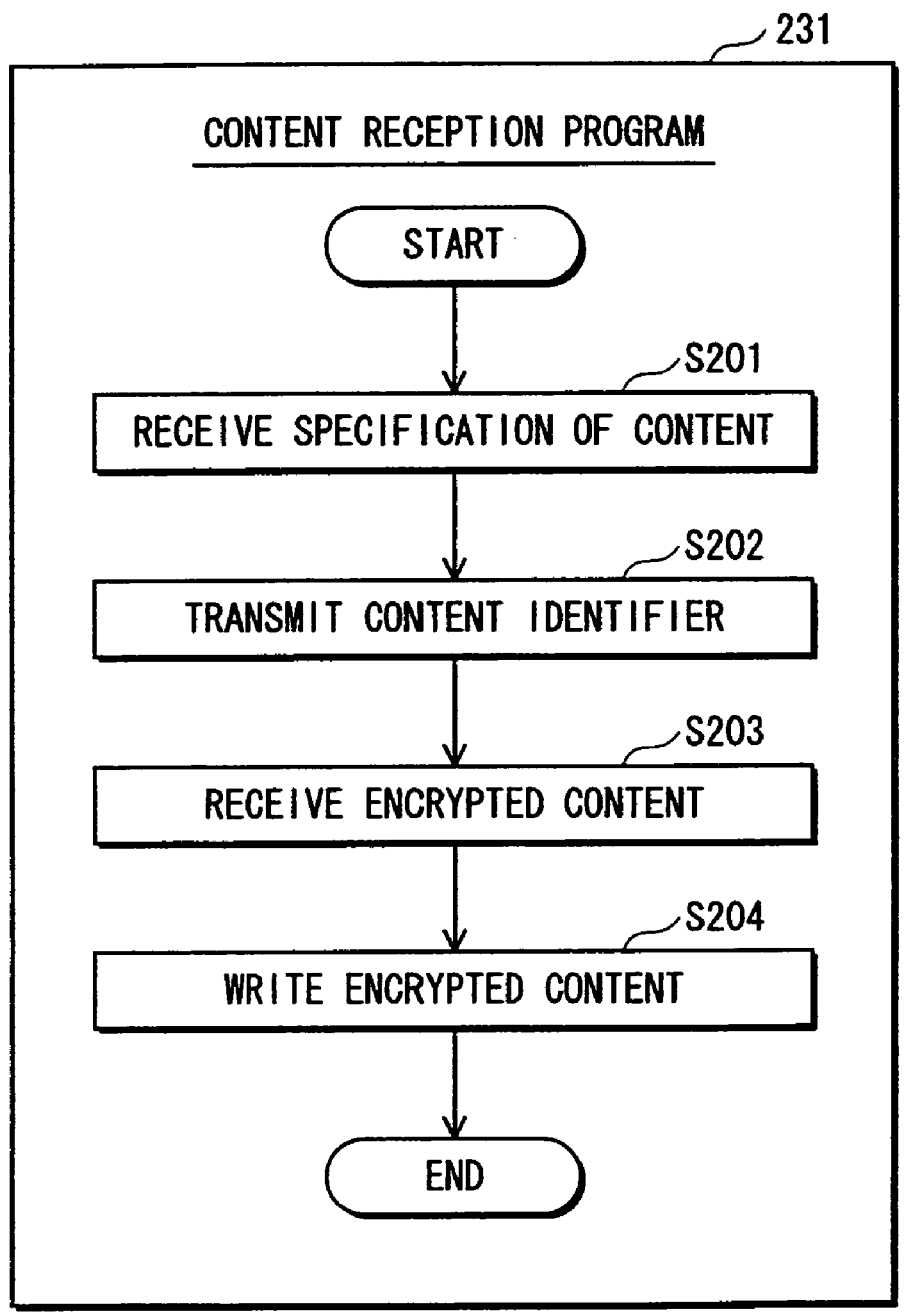
FIG. 9 is flow-chart describing a content receiving program 231.

The content reception program 231 is composed of instruction code sets S201, S202, S203, and S204 arranged in the stated order, as shown in FIG. 9. Each instruction code set contains one or more instruction codes.

The instruction code set S201 includes a plurality of instruction codes that indicates to receive of the specification of the content from the user of the personal computer 200.

The group of instruction codes S202 includes a plurality of instruction codes that indicates to acquire a content identifier identifying the content for which the specification has been received, and to transmit the acquired content identifier to the transmission server 300a via the communication unit 206 and the Internet 20.

The group of instruction codes S203 includes a plurality of instruction codes that indicates to receive the encrypted content from the transmission server 300a via the Internet 20 and the communication unit 206. Note that the received encrypted content is the encrypted content identified by the content identifier.

The group of instruction codes S204 includes a plurality of instruction codes that indicates to write the received encrypted content into the hard disk unit 202 as encrypted content 221.

(b) Content Decryption Program 232

The content decryption program 232 includes instruction code sets S211, S212, S213, S214, S215, S216, S217 and S218 and these instruction code sets are arranged in the stated order in the content decryption program 232, as shown in FIG. 10. Each instruction code set contains one or more instruction codes.

The group of instruction codes S211 includes a plurality of instruction codes that indicates to receive a specification of one of the encrypted content stored in the hard disk unit 202 from a user of the personal computer 200.

The group of instruction codes S212 includes a plurality of instruction codes that indicates to call the playback program 233 stored in the memory 203. Executing the group of instruction codes S212 causes parallel execution of the content decryption program 232 and the playback program 233.

The instruction code set S213 includes a plurality of instruction codes that indicates to assign "−64" as an initial value to a read point indicating a data position in bits in the specified encrypted content, and to subsequently read the key corresponding to the specified encrypted content from the hard disk unit 202.

The instruction code set S214 includes a plurality of instruction codes that indicates to add 64 bits to the read point, and to attempt then to read a block of data, starting at the position in the encrypted content indicated by the resulting read point. The plurality of instruction codes further indicates to read the block of data from the position indicated by the read point if the position lies within the encrypted content, and to output an end code indicating that block reading has ended if the position indicated by the read point lies outside the encrypted content. Note that one block is data with a bit length of 64.

The instruction code set S215 includes a plurality of instruction codes that indicates to end processing by the content decryption program 232 is if the end code is outputted from the instruction code set S214, and to pass control to the next instruction code set S216 if the end code is not outputted.

The instruction code set S216 includes a plurality of instruction codes that indicates to call the decryption program 234 with the read key and the read first block.

The instruction code set S217 includes a plurality of instruction codes that indicates to write the single decrypted block generated by the decryption program 234 to the decrypted content region 236 of the memory 203.

The instruction code set S218 includes a plurality of instruction codes that indicates to pass control to the instruction code set S214.

(c) Playback Program 233

The playback program 233 is composed of the instruction code sets S218, S219, and S220 as shown in FIG. 10, and these instruction code sets are arranged in the stated order in the playback program 233. Each of the instruction code sets contains one or more instruction codes.

The instruction code set S218 includes a plurality of instruction codes that indicates to read at least one decrypted block from the decrypted content region 236 of the memory unit 203.

The instruction code set S219 includes a plurality of instruction codes that indicates to generate the video data and audio data from the read decrypted block, to convert the generated video data and audio data, and to output the resulting video signals and audio signals to the monitor 208 via the display control unit 205.

The instruction code set s220 includes an instruction code indicating a next step of passing control to the instruction code set S218.

(d) Decryption Program 234

Figure 11:
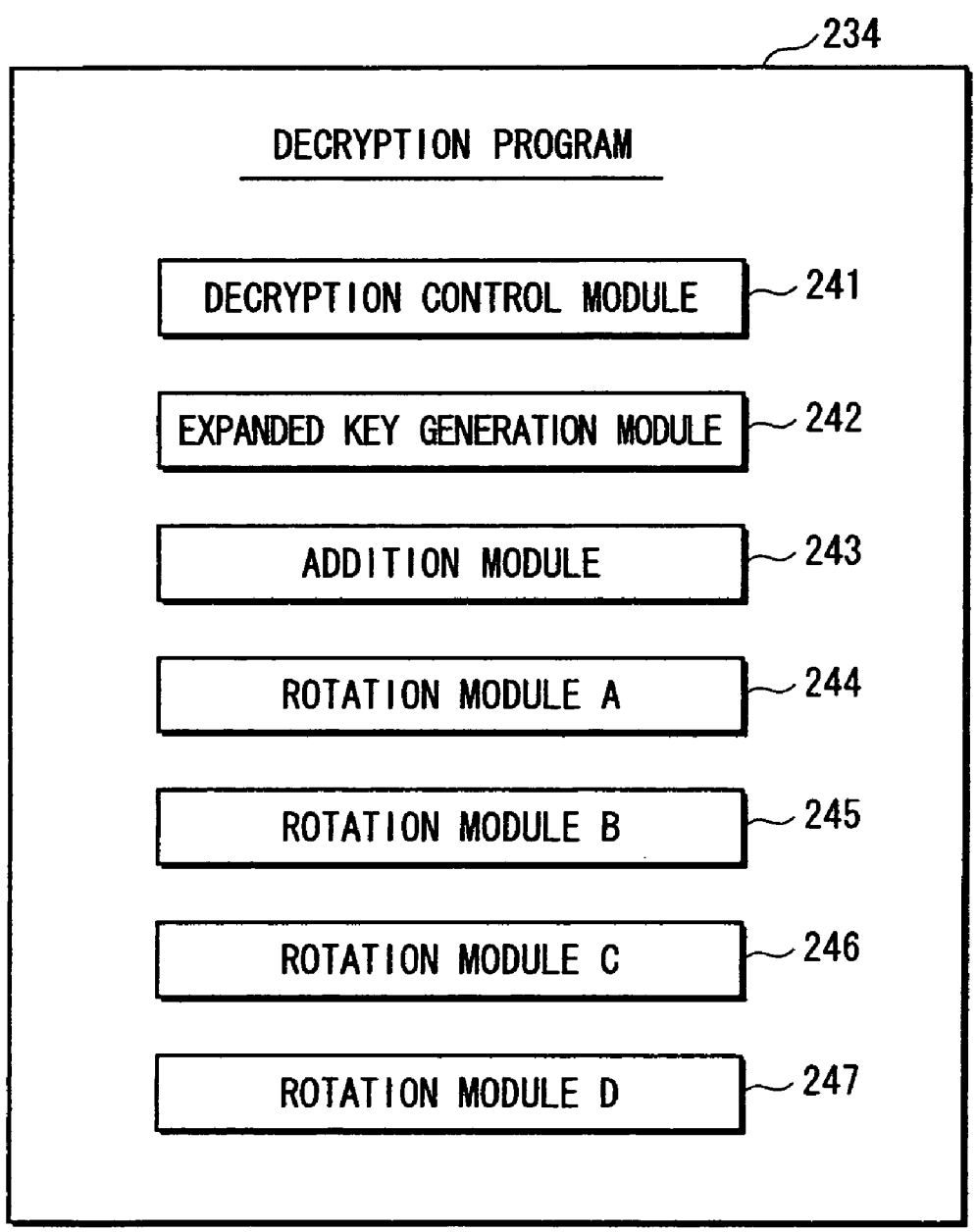
FIG. 11 shows the structure of a decryption program 234.

The decryption program 234 is composed of a decryption control module 241, a expanded key generation module 242, an addition module 243, a rotation module A 244, a rotation module B 245, a rotation module C 246, and a rotation module D 247, as shown in FIG. 11.

Each module is a program composed of combination of instruction codes in a machine language format. The machine language format can be decoded and executed by the microprocessor 201.

A description of the expanded key generation module 242, the rotation module A 244, the rotation module B 245, the rotation module C 246, and the rotation module D 247 is omitted here, since they are respectively identical to the expanded key generation module 142, the rotation module A 143, the rotation module B 144, the rotation module C 145, and the rotation module D 146, shown in FIG. 5.

Decryption Control Module 241

Figure 12:
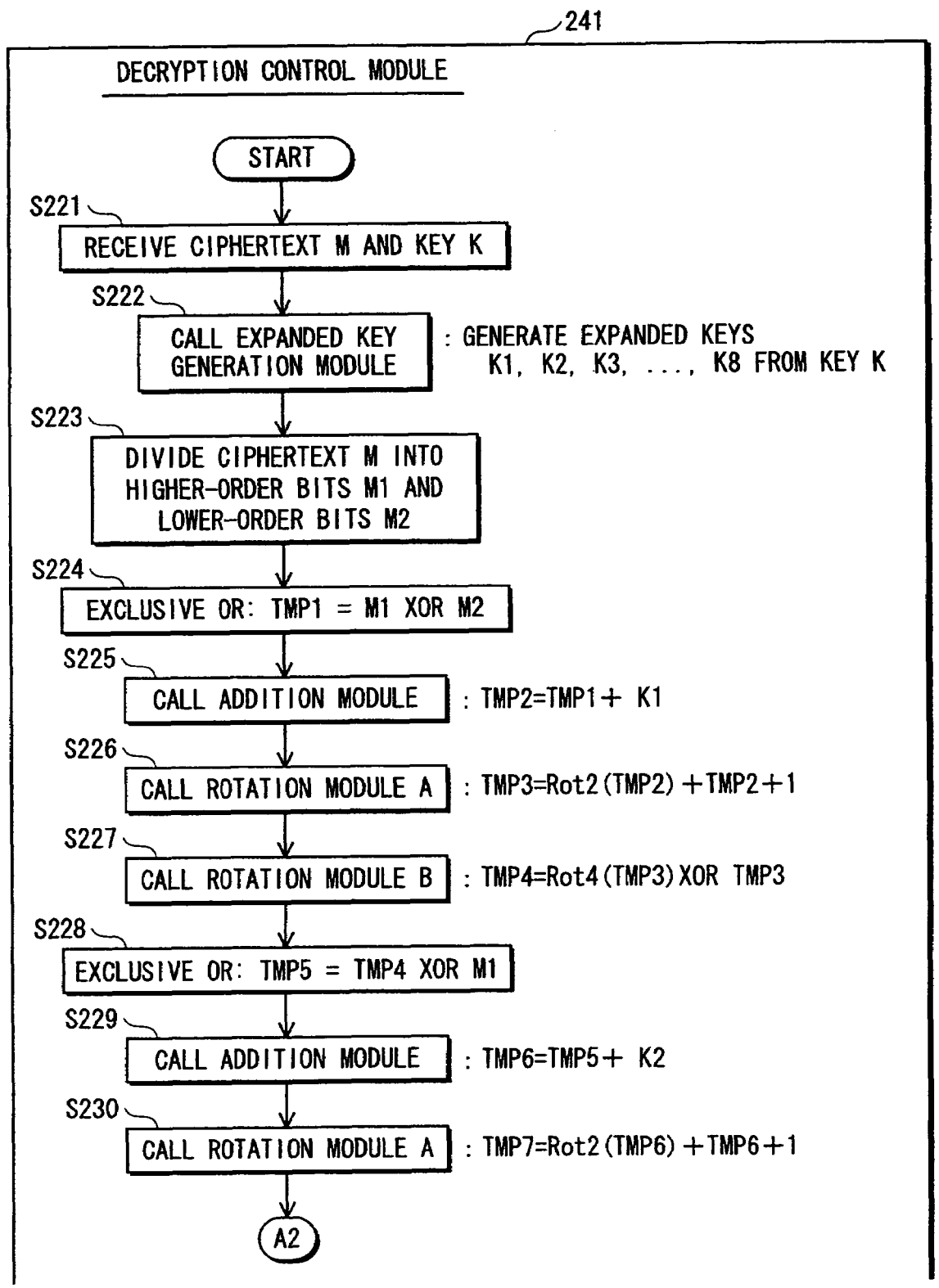
FIG. 12 is a flow-chart describing the content of a decryption control module 241 (continued in FIG. 13)
Figure 13:
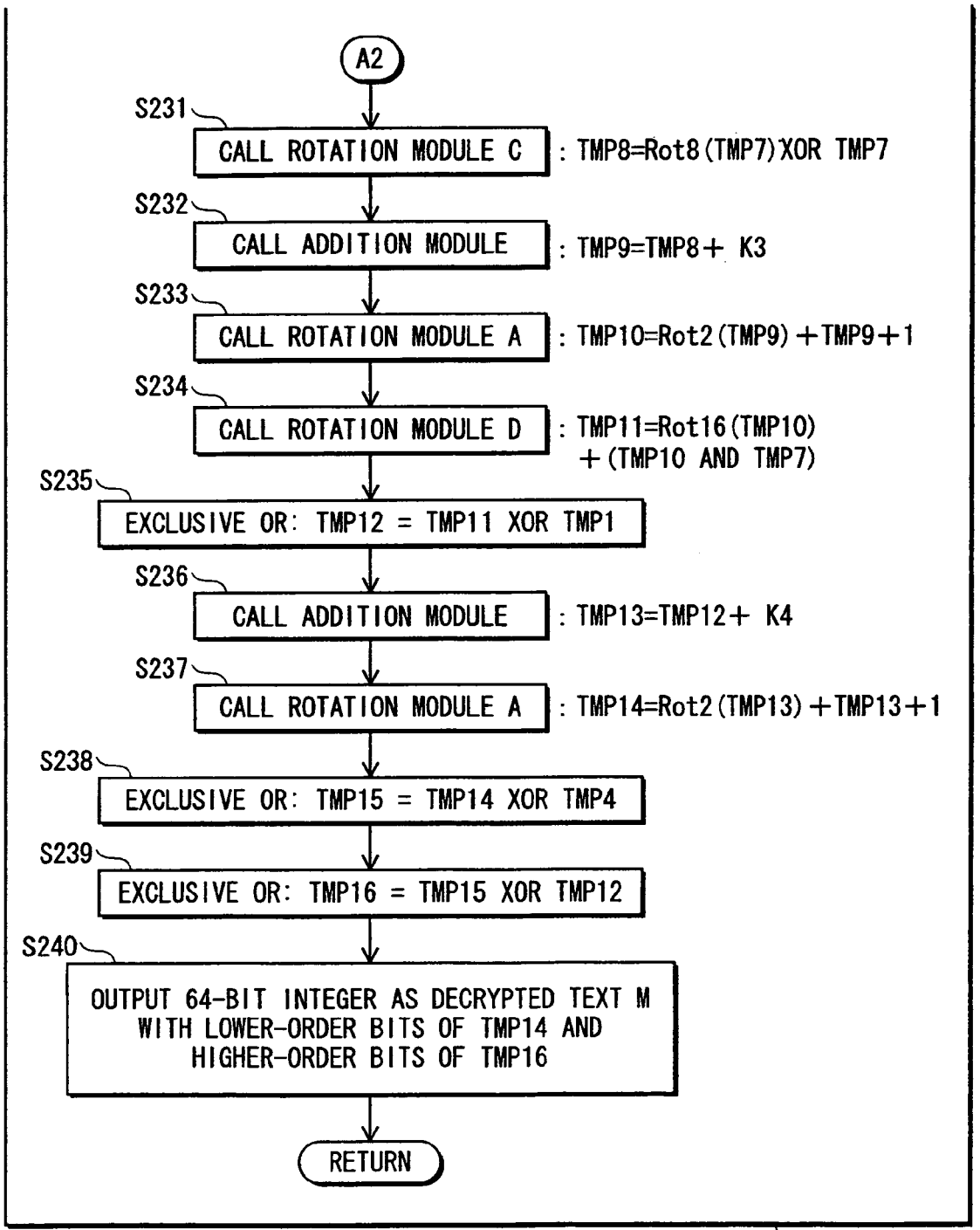
FIG. 13 is a flow-chart describing the content of the decryption control module 241 (continuation of flow-chart from FIG. 12)

The decryption control module 241 is composed to include instruction code sets S221 to S240 as shown in FIGS. 12 and 13, and these instruction code sets are arranged in the stated order in the decryption control module 241. Each instruction code set includes one or more instruction codes.

The instruction code set S221 includes a plurality of instruction codes that indicates to receive a single block of ciphertext M and the key K from the caller program which called the decryption control module 241. Note that one block is data with a bit length of 64

The instruction code set S222 includes a plurality of instruction codes that indicates to call the received key K and the expanded key generation module 242. Execution of the instruction code set S222 results in the generation of the 8 expanded keys K1, K2, K3, . . . ,K8.

The instruction code set S223 includes an instruction code which defines data M1 and an instruction code which defines data M2. The data M1 are the 32 most significant bits of the received ciphertext M, and the data M2 are the 32 least significant bits of the received ciphertext M.

The instruction code set S224 includes a plurality of instruction codes that indicates to take the XOR operation of the data M1 and the data M2, and to store the result of this operation in a variable TMP1.

$$TMP1 = M1 \text{ XOR } M2$$

The instruction code set S225 includes a plurality of instruction codes that indicates to call the addition module 243 with the variable TMP1 and the expanded key K1, and to store the result of the operation in a variable TMP2. As a result TMP2=TMP1+K1 is calculated by the addition module 243.

The instruction code set S226 includes a plurality of instruction codes that indicates to call the rotational module A244 with the variable TMP2, and to store the result of the operation in a variable TMP3.

$$TMP3=Rot2(TMP2)+TMP2+1$$

The instruction code set S227 includes a plurality of instruction codes that indicates to call the rotational module B245 with the variable TMP3, and to store the result of the operation in a variable TMP4.

$$TMP4=Rot4(TMP3) \text{ XOR } TMP3$$

The instruction code set S228 includes a plurality of instruction codes that indicates to perform an XOR operation on the variable TMP4 and the data M1, and to store the result of the operation in a variable TMP5.

$$TMP5=TMP4 \text{ XOR } M1$$

The instruction code set S229 includes a plurality of instruction codes that indicates to call the addition module 243 with the variable TMP5 and the expanded key K2, and to store the result of the operation in a variable TMP6. As a result TMP6=TMP5+K2 is calculated by the addition module 243.

The instruction code set S230 includes a plurality of instruction codes that indicates to call rotation module A244 with the variable TMP6, and to store the result of the operation in a variable TMP7.

$$TMP7=Rot2(TMP6)+TMP6+1$$

The instruction code set S231 includes a plurality of instruction codes that indicates to call the rotation module C246 with the variable TMP7 and to store the result of the operation in a variable TMP8.

$$TMP8=Rot8(TMP7) \text{ XOR } TMP7$$

The instruction code set S232 includes a plurality of instruction codes that indicates to call the addition module 243 with the variable TMP8 and the expanded key K3, and to store the result of the operation in a variable TMP9. As a result, TMP9=TMP8+K3 is calculated by the addition module 243.

The instruction code set S233 includes a plurality of instruction codes that indicates to call the rotation module A 244 with the variable TMP9, and to store the result of the operation in a variable TMP10.

$$TMP10=Rot2(TMP9)+TMP9+1$$

The instruction code set S234 includes a plurality of instruction codes that indicates to call rotation module D 247 with the variable TMP7 and the variable TMP10, and to store the result of the operation in a variable TMP11.

$$TMP11=Rot16(TMP10)+(TMP10 \text{ AND } TMP7)$$

The instruction code set S235 includes a plurality of instruction codes that indicates to perform an XOR operation on the variable TMP11 and the variable TMP1, and to store the result of the operation in a variable TMP12.

$$TMP12=TMP11 \text{ XOR } TMP1$$

The instruction code set S236 includes a plurality of instruction codes that indicates to call the addition module 243 with the variable TMP12 and the expanded key K4, and to store the result of the operation in a variable TMP13. As a result, TMP13=TMP12+K4 is calculated by the addition module 243.

The instruction code set S237 includes a plurality of instruction codes that indicates to call the rotation module A244 with the variable TMP13, and to store the result of the operation in a variable TMP14.

$$TMP14=Rot2(TMP13)+TMP13+1$$

The instruction code set S238 includes a plurality of instruction codes that indicates to perform an XOR operation on the variable TMP14 and the variable TMP4, and to store the result of the operation in a variable TMP15.

$$TMP15=TMP14 \text{ XOR } TMP4$$

The instruction code set S239 includes a plurality of instruction codes that indicates to perform an XOR operation on the variable TMP15 and the variable TMP12, and to store the result of the operation in a variable TMP16.

$$TMP16=TMP15 \text{ XOR } TMP12$$

The instruction code set S240 includes plurality of instruction codes that indicates to output a 64-bit integer having the variable TMP15 as its 32 most significant bits and the variable TMP16 as its least significant bits, as a decrypted text M, to the caller program.

Addition Module 243

Figure 14:
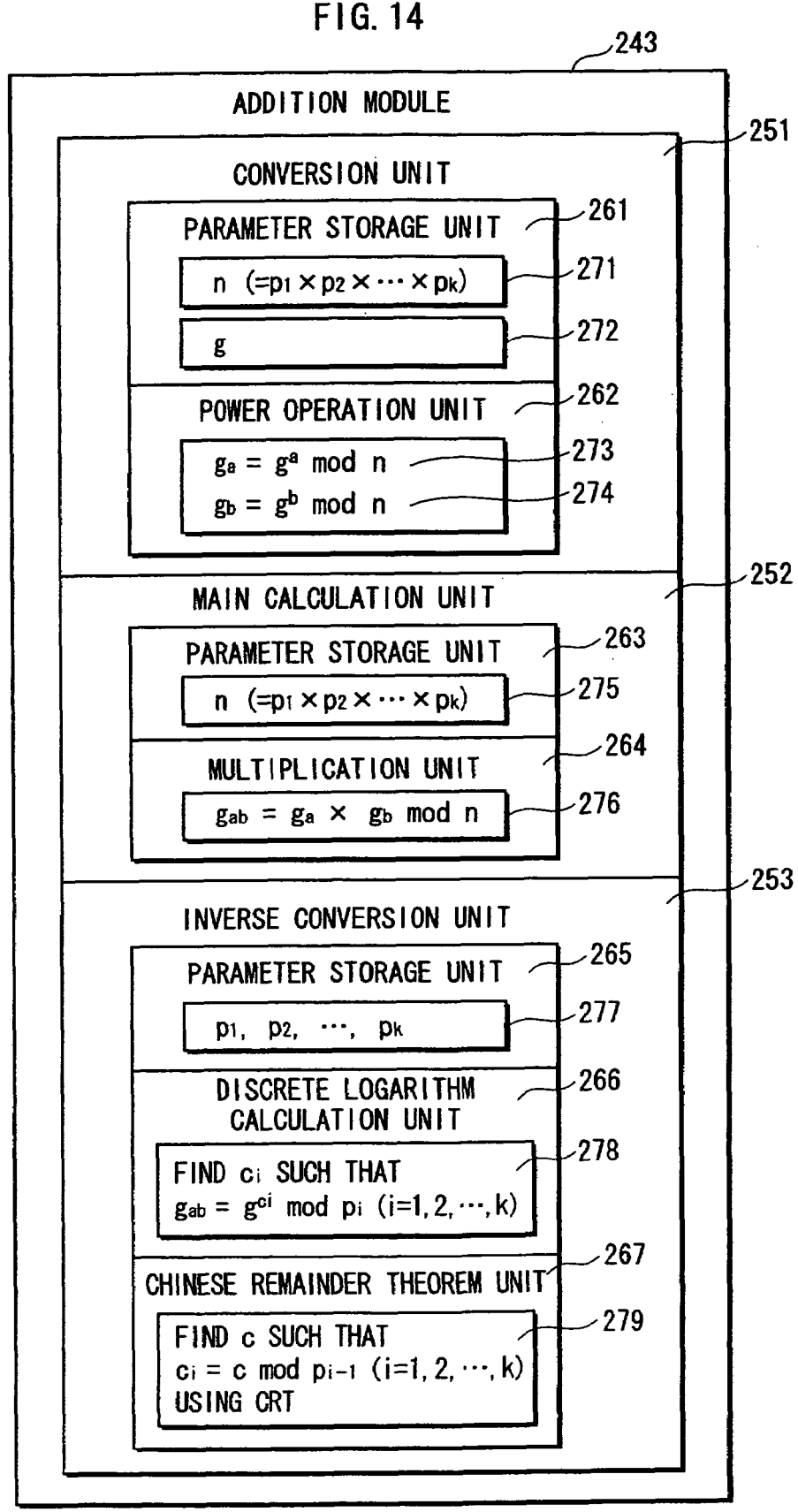
FIG. 14 shows the structure of an addition module 243.

The addition module 243 is a program that calculates data a+b from input data a and b, and outputs the data a+b. As shown in FIG. 14 the addition module is composed of a conversion unit 251, a main calculation unit 252, and an inverse conversion unit 253, as shown in FIG. 14. The conversion unit 251 includes a parameter storage unit 261 and a power operation unit 262. The main calculation unit 252 includes a parameter storage unit 263 and a multiplication unit 264. The inverse calculation unit 253 includes a parameter storage unit 265, a discrete logarithm calculation unit 266, and a CRT (Chinese Remainder Theorem) unit 267.

(i) Definition of Each Parameter and Symbol, and Description of Input Data Conditions The following gives definitions of the various parameters and symbols, and describes conditions on the input data to the addition module 243.

Let $p_i$ (i=1, 2, ..., k) be mutually differing prime numbers. Each $p_i$ (i=1, 2, ..., k) denotes a small prime number so that, say, $p_1=3$, $p_2=5$, $p_3=7$, $p_4=13$, ..., and k=17. Let n be the product of these primes $p_1 \times p_2 \times ... \times p_k$, where the symbol "×" denotes a multiplication. The product n may be a number that can be expressed using approximately 64 bits. In the case that k=17, $n=p_1 \times p_2 \times ... \times p_k > 2^{64}$.

$p_i$ (i=1, 2, ..., k) are stored by the inverse conversion unit 253, and n is stored by both the conversion unit 251 and the main calculation unit 252.

The addition module 243 performs multiplicative group operations in the integer residue ring Z/nZ, which is composed of integers modulo n. Let g be a pre-assigned value belonging to the multiplicative group and a primitive element for $p_i$ (i=1, 2, ..., k)).

Saying that g is the primitive element for $p_i$ (i=1, 2, ..., k) means that for each $p_i$, g has a value such that when m is given values of 1, 2, ..., the first value of m that satisfies $g^m=1 \mod p_i$ is $p_i-1$.

Let L=LCM ($p_1-1, p_2-1, ..., p_k-1$), where LCM ($p_1-1, p_2-1, ..., p_k-1$) denotes the Least Common Multiple of $p_1-1, p_2-1, ..., p_k-1$.

The input data a and b are each non-negative integers smaller than L/2.

(ii) Construction of Conversion Unit 251

The conversion unit 251 includes the parameter storage unit 261 and the power operation unit 262.

The parameter storage unit 261 stores n and g.

The power operation unit 262 receives the input data a and b, calculates $g_a = g^a \bmod n$ and $g_b = g^b \bmod n$ for the received input data a and b, and outputs the obtained $g_a$ and $g^b$ to the main calculation unit 252.

(iii) Construction of Main Calculation Unit 252

The main calculation unit 252 includes the parameter storage unit 263 and the multiplication unit 264.

The parameter storage unit 263 stores the parameter n.

The multiplication unit 264 receives $g_a$ and $g_b$ from the power operation unit 262, calculates $g_{ab} = g_a \times g_b \bmod n$ for the received $g_a$ and $g_b$, and outputs the obtained $g_{ab}$ to the inverse conversion unit 253.

(iv) Construction of Inverse Conversion Unit 253

The inverse conversion unit 253 includes the parameter storage unit 265, the discrete logarithm calculation unit 266, and the CRT unit 267.

The parameter storage unit 265 stores $p_1, p_2, \ldots, p_k$.

The discrete logarithm calculation unit 266 receives $g_{ab}$ from the multiplication unit 264, and calculates the discrete logarithms $c_i \bmod p_i - 1$, of $g_{ab} \bmod p_i$ (i=1, 2, ..., k) with respect to a base of g mod $p_i$.

In other words, the discrete logarithm calculation unit 266 calculates $c_i \bmod p_i - 1$ (i=1, 2, ..., k) satisfying $g_{ab} = g^{ci} \bmod p_i - 1$ (i=1, 2, ..., k), and then outputs the obtained $c_i \bmod p_i - 1$ (i=1, 2, ..., k) to the CRT unit 267.

Various calculation methods exist for calculation of $c_i \bmod p_i - 1$ by the discrete logarithm calculation unit 266. The following is one such method.

Here, w is put to 1, 2, 3 ... in the stated in order to find w satisfying $g^w = g_{ab} \bmod p_i$. The thus found w is designated as $c_i$. Alternatively the calculation results $g^1, g^2, \ldots, g^{(pi-2)} \bmod pi$ for each $p_i$ may be stored as a table, and the table searched to find the value of $g^w$ that equals $g_{ab} \bmod p_i$. This in turn gives a value of w to designate as $c_i$.

The CRT unit 267 receives the $c_i \bmod p_i - 1$ (i=1, 2, 3, ..., k) from the discrete logarithm calculation unit 266, and finds the discrete logarithm c mod L of $g_{ab} \bmod n$ with respect to base g mod n from the received $c_i \bmod p_i - 1$ (i=1, 2, 3, ..., k) using the Chinese Remainder Theorem. In other words the CRT unit 267 finds c to satisfy $c_i = c \bmod p_i - 1$ (i=1, 2, 3, ..., k).

To find c mod L (where L=LCM $(p_1 - 1, p_2 - 1, \ldots, p_k - 1)$) from the discrete logarithm $c_i \bmod p_i - 1$ (i=1, 2, 3, ..., k) using the Chinese Remainder Theorem, the following method is used.

In order to avoid complicated expressions, let $m_i = p_i - 1$.

First it is calculated that $u_2 = m_1 \times (m_1^{-1} \bmod(m_2/GCD(m_1, m_2))) \times (c_2 - c_1) + c_1$ where GCD(a, b, c ...) indicates the Greatest Common Divisor of a, b, c ....

Next, it is calculated that $u_3 = (m_1 \times m_2) \times ((m_1 \times m_2)^{-1} \bmod(m_3/GCD(m_1, m_2, m_3))) \times (c_3 - u_2) + u_2$, and $u_4 = (m_1 \times m_2 \times m_3) \times ((m_1 \times m_2 \times m_3)^{-1} \bmod(m_4/GCD(m_1, m_2, m_3, m_4))) \times (c_4 - u_3) + u_3$.

Similarly, $u_1, u_2, \ldots, u_{k-1}$ are calculated in this order. Lastly, the following is calculated:

$u_k = (m_1 \times m_2 \times m_3 \times \ldots \times m_{k-1}) \times ((m_1 \times m_2 \times \ldots \times m_{k-1})^{-1} \bmod(m_k/GCD(m_1, m_2, m_3, m_4, \ldots, m_k))) \times (c_k - u_{k-1}) + u_{k-1}$.

Next, $c = u_k$ is calculated to obtain c.

Note that a method for calculating the c mod L that satisfies c mod $p_i - 1 = c_i$ from the $c_i$ (i=1, 2, 3 ... k) using the CRT 267 is described in detail in the non-patent document 2.

Next, the CRT unit 267 outputs the obtained c to the caller program which called the addition module 243.

(v) Operation of Addition Using Addition Module 243

Figure 15:
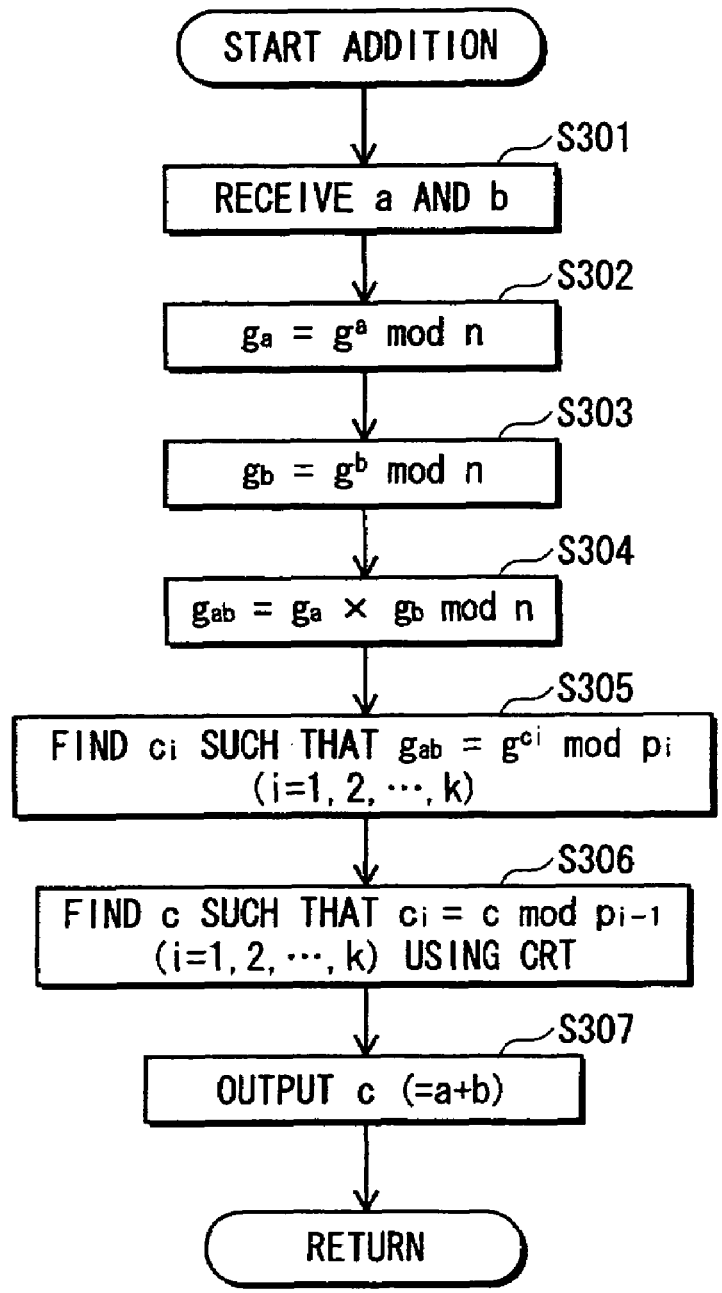
FIG. 15 is a flow-chart showing an addition operation by the addition module 243.

Operations of addition using the addition module 243 are described with reference to the flow-chart shown in FIG. 15.

The power operation unit 262 receives the input data a and b from the caller program which called the addition module 243 (Step S301), and calculates $g_a = g^a \bmod n$ and $g_b = g^b \bmod n$ for the input data a and b (Steps S302 and S303).

Next, the multiplication unit 264 calculates $g_{ab} = g_a \times g_b \bmod n$ for $g_a$ and $g_b$ (Step S304).

Next, the discrete logarithm calculation unit 266 finds $c_i \bmod p_i - 1$ (i=1, 2, 3, ..., k) satisfying $g_{ab} = g^{ci} \bmod p_i$ (i=1, 2, ..., k) (Step S305). The CRT unit 267 finds c satisfying $c_i = c \bmod p_i - 1$ (i=1, 2, ..., k) (Step S306), and outputs the obtained c to the caller program which called the addition module 243 (Step S307).

(vi) Verification of Addition Operation by Addition Module

It is verified below that the addition unit 243 outputs the data a+b for the input data a, b.

$g_a = g^a \bmod n$ and $g_b = g^b \bmod n$ are calculated for the input data a and b in the conversion unit 251, and $g_{ab} = g_a \times g_b \bmod n$ is calculated in the main calculation unit 252. At this stage, it is obvious that $g_{ab} = g^{(a+b)} \bmod n$ is satisfied.

The inverse conversion unit 253 calculates $c_i$ that satisfy $g^{ab} = g^{ci} \bmod p_i$ (i=1, 2, ..., k) from g and $g_{ab}$, and calculates c mod L to satisfy $c = c_i \bmod p_i - 1$. Here, c satisfies $g_{ab} = g^c \bmod n$. This is because a+b=c mod L gives $g^{(a+b-c)} = 1 \bmod n$. Thus, since c satisfies $g^{(a+b)} \bmod n = g^c \bmod n$, c also satisfies a+b=c $\bmod((p_1-1) \times (p_2-1) \times \ldots \times (p_k-1))$. a<L/2 and b<L/2 gives a+b<L. Thus, the addition module 243 will output data a+b, the sum of data a and data b.

1.4 Effects of the First Embodiment

The addition module 243 converts the values that are to be added. Note that even when the conversion unit 251 and the inverse conversion unit 253 are difficult to analyze, there is a risk that an analyst will discover the values $g_a$, $g_b$ and $g_{ab}$, and discover the processing by which $g_{ab}$ is calculated from $g_a$ and $g_b$. However, even in the event that the values $g_a$, $g_b$ and $g_{ab}$ are discovered, it is still difficult to infer the unconverted values a and b from the converted values $g_a$ and $g_b$. Moreover, the addition module 243 performs multiplication in the main calculation unit 252, and it is difficult infer from this operation of multiplication that the addition module 243 is in fact realizing an addition. Consequently, the first embodiment has the effect of making it possible to conceal not only the input values to the addition operation, but also the operation itself.

The decryption control unit 241 uses the addition module 243 when adding the key to other data. Consequently, it is difficult to infer the values that are being added, including the values of the key. Moreover, even if the analyst knows the encryption algorithm it is difficult for them to infer that the key addition portion is performing an addition involving the key. Therefore, even an analyst carrying out an attack specifically to find the key addition portion characteristic of encryption algorithms will have difficulties due to the difficulty of finding the key addition portion. Hence, the embodiment is effective in making an attack by an analyst difficult.

2. Second Embodiment

The addition module 501 may be used in place of the addition module 243 of the first embodiment. The addition module 501 is described below.

2.1 Construction of Addition Module 501

Figure 16:
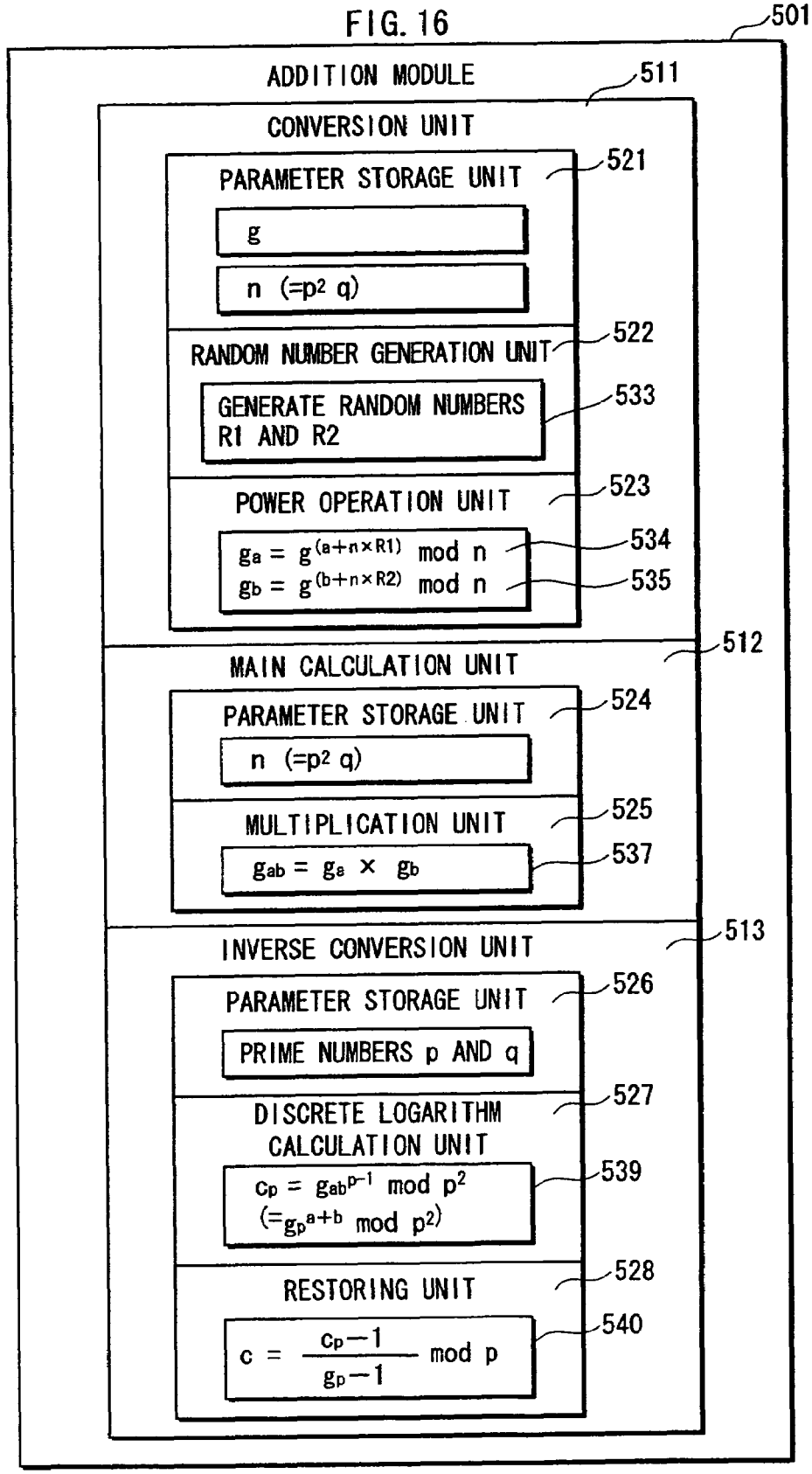
FIG. 16 shows the structure of an addition module 501.

The addition module 501 is a program that calculates the data a+b from data a and data b and outputs the data a+b, similarly to the addition module 243. The addition module 501 is composed of a conversion unit 511, a main calculation unit 512, and an inverse conversion unit 513, as shown in FIG. 16. The conversion unit 511 is composed of a parameter storage unit 521, a random number generation unit 522, and a power operation unit 523. The main calculation unit 512 includes a parameter storage unit 524 and a multiplication unit 525. The inverse conversion unit 513 includes a parameter storage unit 526, a discrete logarithm calculation unit 527, and a reduction unit 528.

2.2 Definition of Each Parameter and Symbol, and Description of Input Data Conditions The following gives definitions of each parameter and symbol used in the addition module 501, and describes input data conditions.

Let p and q be prime numbers, and let $n = p^2 \times q$. p and q are stored by the inverse conversion unit 513, and n is stored by both the conversion unit 511 and the main calculation unit 512.

The addition module 501 uses multiplicative group operations of an integer residue ring Z/nZ, which is composed of integers modulo n. Let g be a pre-assigned number belonging to the multiplicative group and the order of $g^{(p-1)} \bmod p^2$ be p. Moreover, let $g_p$ be defined as $g^{(p-1)} \bmod p^2$.

Input data a and b are non-negative numbers each smaller than p/2.

2.3 Construction of Conversion Unit 511

The conversion unit 511 is composed of a parameter storage unit 521, a random number generation unit 522, and a power operation unit 523.

The parameter storage unit 521 stores the parameters n and g.

The random number generation unit 522 generates random numbers R1 and R2, neither of which is greater than n.

The power operation unit 523 calculates $$g_a = g^{\wedge}(a + n \times R1) \bmod n, \text{ and}$$

$$g_b = g^{\wedge}(b + n \times R2) \bmod n$$

for the input data a and b using the random numbers R1 and R2 calculated by the random number generation unit 522.

In this specification, the symbol "^" is an operator indicating a power. For instance, $a^{\wedge} b = a^b$. In this specification $a^{\wedge} b$ and $a^b$ type expressions are variously used for ease of expression.

Next, the power operation unit 523 outputs the results $g_a$ and $g_b$ to the main calculation unit 512.

2.4 Construction of Main Calculation Unit 512

The main calculation unit 512 is composed of a parameter storage unit 524 and a multiplication unit 525.

The parameter storage unit 524 stores n.

The multiplication unit 525 receives the calculation results $g_a$ and $g_b$ from the power operation unit 523, calculates $g_{ab} = g_a \times g_b$ for the received $g_a$ and $g_b$, and outputs the result $g_{ab}$ to the inverse conversion unit 513.

2.5 Construction of Inverse Conversion Unit 513

The inverse conversion unit 513 is composed of a parameter storage unit 526, a discrete logarithm calculation unit 527, and a reduction unit 528.

The parameter storage unit 526 stores p.

The discrete logarithm calculation unit 527 receives the calculation result $g_{ab}$ from the multiplication unit 525, calculates $$c_p = g_{ab}^{(p-1)} \bmod p^2$$

for the received $g_{ab}$ using the parameter p that is stored in the parameter storage unit 526, and subsequently outputs $c_p$ to the reduction unit 528.

The reduction unit 528 receives $c_p$ from the discrete logarithm calculation unit 527, calculates the discrete logarithm c of $c_p$ with respect to base $g_p \bmod p^2$ using the received $c_p$, and outputs the obtained discrete logarithm c, to the caller program.

The calculation method for c in the reduction unit 528 is described in more detail in patent document 2. In practice, it involves the following.

The reduction unit finds, for $c_p$, a c satisfying $$c = (c_p - 1)/(g_p - 1) \bmod p.$$

2.6 Addition Operations by Addition Module 501

Figure 17:
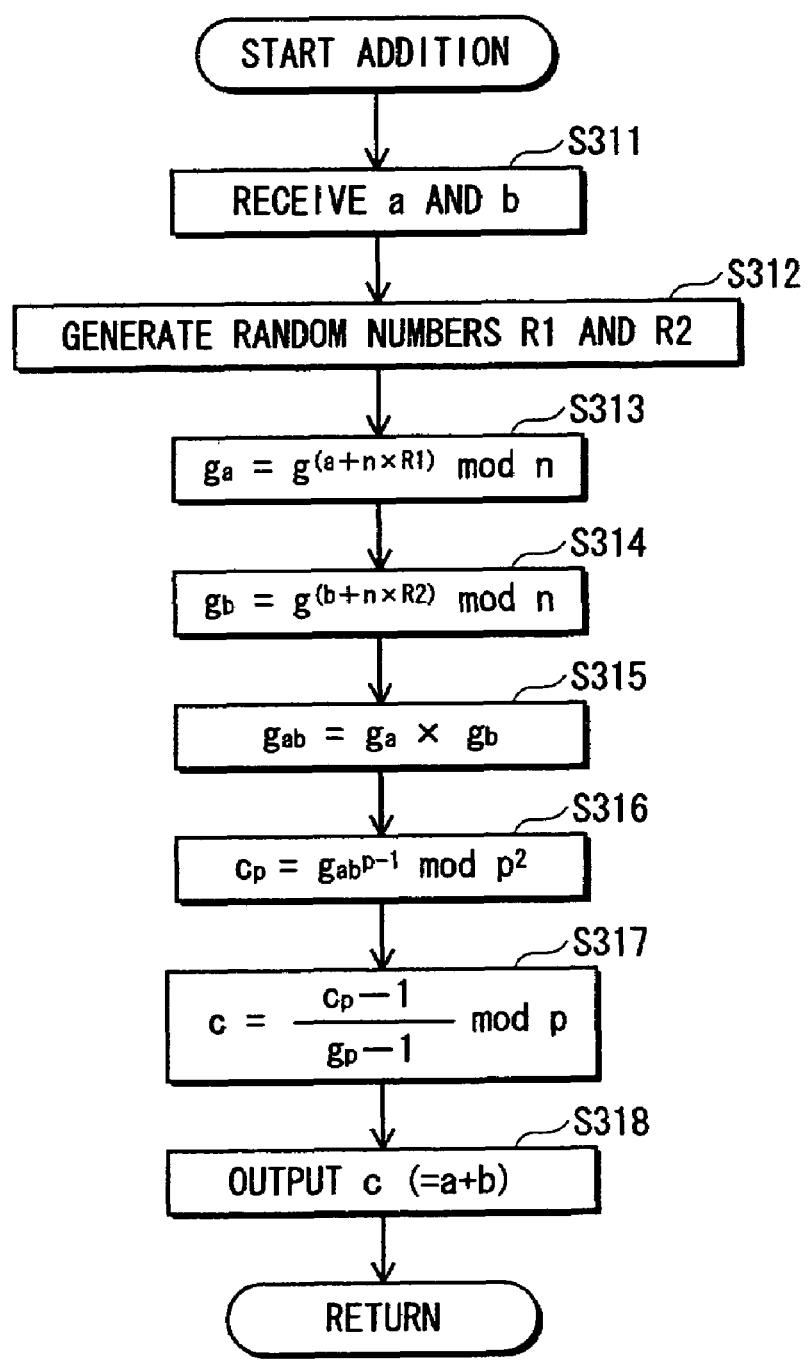
FIG. 17 is a flow-chart showing an adding operation by the addition module 501.

The addition operations by the addition module 501 are described with reference to the flow-chart shown in FIG. 17.

The power operation unit 523 receives the input data a and b from the caller program (Step S311), the random number generation unit 522 generates the random numbers R1 and R2 neither of which is greater than n (Step S312), and the power operation unit 523 calculates $$g_a = g^{\wedge}(a + n \times R1) \bmod n, \text{ and}$$

$$g_b = g^{\wedge}(b + n \times R2) \bmod n \text{ (Step } S313 \text{ to } S314).$$

Note that, in this specification, the symbol "^" is an operator indicating a power. For instance, $a^{\wedge} b = a^b$. In this specification both "$a^{\wedge} b$" and "$a^b$" type-expressions are variously used.

Next, the multiplication unit 525 calculates $g_{ab} = g_a \times g_b \bmod n$ (Step S315).

Next, the discrete logarithm calculation unit 527 calculates $c_p = g_{ab}^{(p-1)} \bmod p^2$ (Step S316), the reduction unit 528 finds c such that $c = (c_p - 1)/(g_p - 1) \bmod p$ (Step S317), and subsequently outputs c (=a+b) to the caller program (Step S318).

2.7 Verification of Addition Operation by Addition Module 501

It is verified below that the addition module 501 outputs a+b for input data a and b.

In the conversion unit 511, $$g_a = g^{\wedge}(a + n \times R1) \bmod n, \text{ and}$$

$$g_b = g^{\wedge}(b + n \times R2) \bmod n$$

are calculated for a and b. In the main calculation unit 512, $g_{ab} = g_a \times g_b \bmod n$ is calculated. At this stage, it is obvious that $g_{ab} = g^{\wedge}(a + b + n \times (R1 + R2)) \bmod n$ is satisfied. The inverse conversion unit 513 calculates $$c_p = g_{ab}^{(p-1)} = g_p^{\wedge}(a + b + n \times (R1 + R2)) \bmod p^2.$$

From $g_p^p = 1 \bmod p^2$, $$g_p^n = 1 \bmod p^2,$$

giving $c_p = g_p^{(a+b)} \bmod p^2$

The conversion unit 513 finds the discrete logarithm c of $c_p$ with respect to base $g_p \bmod p^2$. In other words, $c_p = g_p^{\ c} \bmod p^2$ is satisfied. Consequently, c=a+b mod p. Moreover, a<p/2 and b<p/2 gives a+b<p. Therefore, the addition module 501 will output the result of the addition of the input data a and b.

2.8 Effects of Addition Module 501

The addition module 501 converts the values that are to be added. Provided the conversion unit 511 and the inverse conversion unit 513 are difficult to analyze, it is then difficult to infer the unconverted values from the converted values. Moreover, the addition module 501 performs multiplication in the main calculation unit 512, and it is difficult to infer from the multiplication operation that the addition module 501 is in fact realizing an addition. Consequently, the addition module 501 has the effect of making it possible to conceal not only the input values for the addition, but also the operation of addition itself.

2.9 Notes (1)

In the addition module 501, the power operations in the multiplicative group of the integer residue ring Z/nZ are performed by the conversion unit 511. The discrete logarithm problem in the multiplicative group of the integer residue ring $Z/p^2Z$, which is a subgroup of the multiplicative group of the integer residue ring Z/nZ, is solved by the inverse conversion unit 513. Consider the case in which the analyst does not know p or q but has been able to discover that power operations are being performed in the conversion unit 511. In this case, only the inverse conversion unit 513 is difficult to analyze. However, if n is large enough to make prime factorization difficult (of the order of 1024 bits), p and q are very difficult to obtain since to do so would require a prime factorization of n. Without obtaining p and q, the discrete logarithm problem in the multiplicative group of the residue integer ring Z/nZ is hard. Generally, when the size (number of elements) of a multiplicative group is large (of the order of 1024 bits, for instance), the discrete logarithm problem in the group is hard. In the addition module 501, if p is known, the discrete logarithm problem in the multiplicative group $Z/p^2Z$ is easily solvable by inverse conversion in the inverse conversion unit 513. The addition module 501 differs from the addition module 243 in that the addition module 501 makes use of the fact that inverse conversion is easy if p is known but difficult if p is unknown.

2.10 Notes (2)

The addition module 501 may be composed as follows.

Let p and q be prime numbers, and $n=p^m \times q$, where m is an integer. The addition module 501 makes use of calculations in the multiplicative group of the integer residue ring composed of integers modulo n. Let g be a pre-assigned number belonging to the multiplicative group where the order of $g^{(p-1)}$ mod $p^m$ is p. Moreover, define $g_p = g^{(p-1)}$ mod $p^m$.

The discrete logarithm calculation unit 527 receives the calculation result $g_{ab}$ from the multiplication unit 525, and uses the prime p stored in the parameter storage unit 526, to calculate $$c_p = g_{ab}^{(p-1)} \bmod p^m,$$

and subsequently outputs $c_p$ to the reduction unit 528.

The reduction unit 528 receives $c_p$ from the discrete logarithm calculation unit 527, calculates the discrete logarithm c of $c_p$ with respect to $g_p$ modulo $p^m$, and outputs the obtained c to the caller program.

3. Modifications (2)

An addition module 601 may be used in place of the addition module 243 of the first embodiment. The addition module 601 is described below. The addition module 601 uses scalar multiplication on an elliptic curve. Elliptic curves are described in detail in non-patent document 3.

3.1 Construction of Addition Module 601

Figure 18:
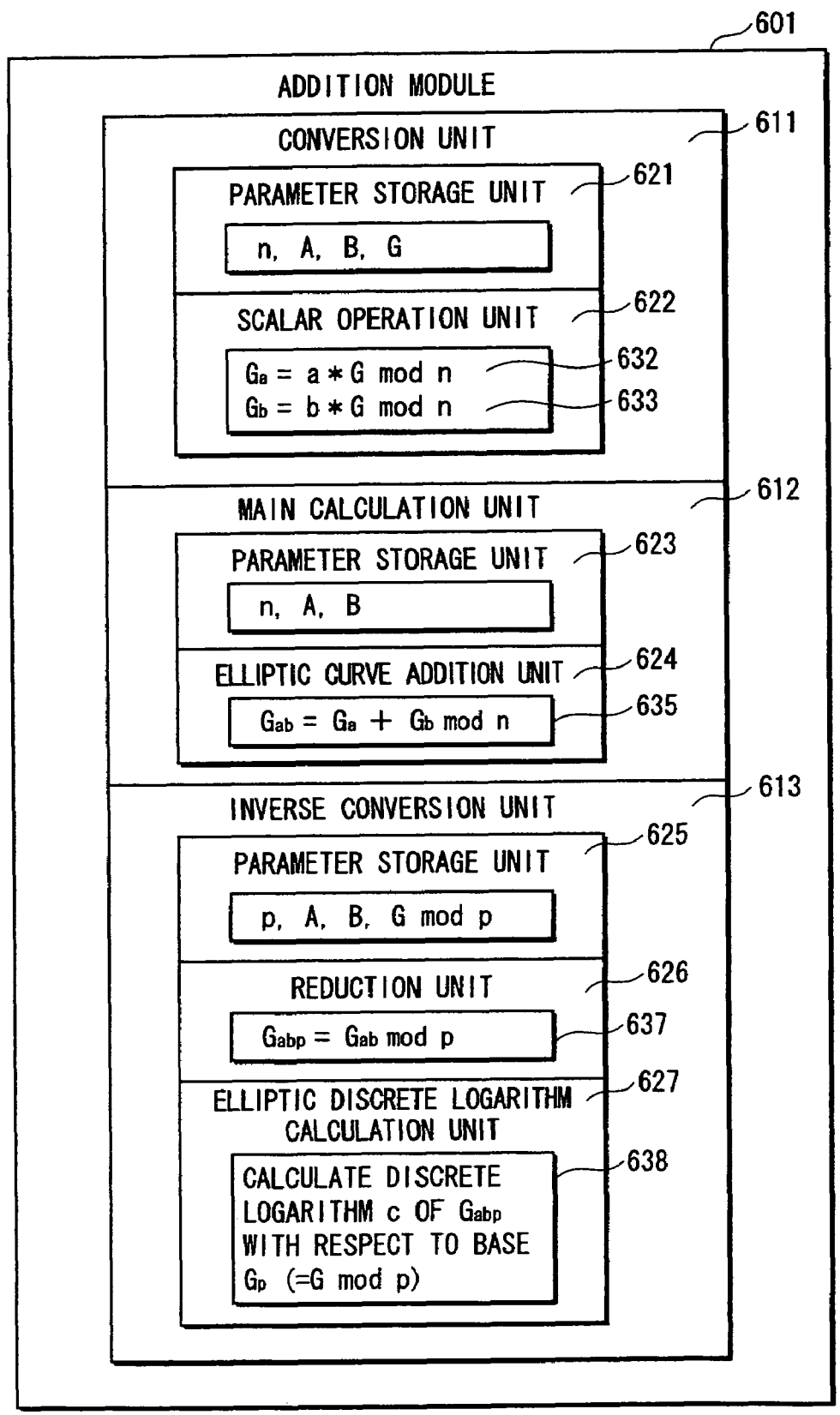
FIG. 18 shows the structure of an addition module 601.

The addition module 601 is a program that calculates and outputs data a+b for input data a and b, similarly to the addition module 243. As shown in FIG. 18, the addition module 601 is composed of a conversion unit 611, a main calculation unit 612, and an inverse conversion unit 613. The conversion unit 611 includes a parameter storage unit 621 and a scalar multiplication unit 622. The main calculation unit 612 includes a parameter storage unit 623 and an elliptic curve addition unit 624, and the inverse conversion unit 613 includes a parameter storage unit 625, a reduction unit 626, and a discrete logarithm calculation unit 627.

3.2 Definition of Each Parameter and Symbol, and Input Data Conditions

The following description gives definitions of the various parameters and symbols used in the addition module 601, and describes input data conditions.

Let p and q be prime numbers, and let n=p×q. p and q are stored by the inverse conversion unit 613, and n is stored by both the conversion unit 611 and the main calculation unit 612.

Let the equation for an elliptic curve E be $y^2 = x^3 + A \times x + B$, where $A$ and $B$ are parameters of the elliptic curve $E$.

Let $G=(x_g, y_g)$ mod n be a point on the elliptic curve E satisfying $y_g^2 = x_g^3 + A \times x_g + B$ mod n.

A, B and G are stored by the conversion unit 611, the main calculation unit 612, and the inverse conversion unit 613.

The group composed of points in a field GF(p) which satisfy the equation of the elliptic curve E is denoted E(GF(p)). Similarly, the group composed of points in a field GF(q) which satisfy the equation of the elliptic curve E is denoted E((GF(q)).

The elliptic curve group over Z/nZ is denoted as the product of E(GF(p)) and E(GF(q)), which is E(GF(p))×E(GF(q)). Note that since Z/nZ is a ring rather than a field, mathematically E(GF(p))×E(GF(q)) cannot be called an elliptic curve. However, for convenience, E(GF(p))×E(GF(q)) is called a direct product elliptic curve group over Z/nZ.

For the point $G=(x_g, y_g)$ mod n of the elliptic curve E(GF(p))×E(GF(q)) over Z/nZ, which corresponds to the point $G_p=(x_{gp}, y_{gp})$ mod p in E(GF(p)) and to the point $G_q=(x_{gq}, y_{gq})$ mod q in E(GF(q)), $x_g$ is defined as a number satisfying $x_g \bmod p = x_{gp}$ and $x_g \bmod q = x_{gq}$ and $y_g$ is defined as a number which satisfies $y_g \bmod p = y_{gp}$ and $y_g \bmod q = y_{gq}$ According to this definition, a point $G_p$ in E(GF(p)) corresponding to the point $G=(x_g, y_g)$ mod n in E(GF(p))×E(GF(q)) is $G_p = (x_{gp}, y_{gp}) \bmod p,$ and a point $G_q$ in E(GF(q)) is $G_q = (x_{gq}, y_{gq}).$ Hence, E(GF(p)) and E(GF(q)) are regarded as subgroups of E(GF(p))×E(GF(q)).

In the addition unit 601, the elliptic curve E is an elliptic curve modulo p whose order (the number of points on the curve) is p. This kind of elliptic curve over the field GF(p) is known as an anomalous elliptic curve.

Further, the elliptic curve E is an elliptic curve modulo q. This means that GF(q) is also an anomalous elliptic curve.

The elliptic curve over Z/Zn is known as a Super-anomalous elliptic curve. Super-anomalous elliptic curves are described in non-patent document 4.

The group of the elliptical curve over Z/nZ is E(GF(p))×E(GF(q)), meaning that the order of this elliptical curve is $$n(=p \times q).$$

The input data a and b are non-negative numbers smaller than p/2.

3.3 Construction of Conversion Unit 611

The conversion unit 611 is composed of a parameter storage unit 621 and a scalar multiplication unit 622. The parameter storage unit 621 stores parameters n, A, B, and G.

The scalar multiplication unit 622 receives input data a and b from the caller program, calculates $$G_a = a*G \bmod n$$

$$G_b = b*G \bmod n$$

for the received input data a and b using the n, A, B and G stored in the parameter storage unit 621.

Note that a*G is a point obtained by adding together a lots of G using elliptic curve addition. Further, a*G mod n is implemented modulo n for each coordinate of a*G.

The scalar multiplication unit 622 outputs the calculation results $G_a$ and $G_b$ to the main calculation unit 612.

3.4 Construction of Main Calculation Unit 612

The main calculation unit 612 is composed of a parameter storage unit 623 and an elliptic curve addition unit 624.

The parameter storage unit 623 stores n, A and B.

The elliptic curve addition unit 624 receives the calculation results $G_a$ and $G_b$ from the scalar multiplication unit 622, executes elliptic curve addition on $G_a$ and $G_b$ using the n, A and B stored in the parameter storage unit 623 to calculate $$G_{ab} = G_a + G_b \bmod n,$$

and outputs the calculation result $G_{ab}$ to the inverse conversion unit 613.

3.5 Construction of Inverse Conversion Unit 613

The inverse conversion unit 613 is composed of a parameter storage unit 625, a reduction unit 626, and a discrete logarithm unit 627.

The parameter storage unit 625 stores p, A, B, and G mod p.

The reduction unit 626 receives the calculation result $G_{ab}$ from the elliptic curve addition unit 624 for the received $G_{ab}$, uses the p stored in the parameter storage unit 625 to calculate $$G_{abp} = G_{ab} \bmod p,$$

and outputs the calculation result to the discrete logarithm calculation unit 627.

The discrete logarithm calculation unit 627 calculates the discrete logarithm c mod p of $G_{abp}$ with respect to base G mod p. In other words, the discrete logarithm calculation unit 627 finds c to satisfy $G_{abp} = c*G$. Next the discrete logarithm calculation unit 627 outputs c to the caller program.

Note that the c found by the elliptic curve discrete logarithm calculation unit 627 is the solution to the discrete logarithm problem on the anomalous elliptic curve. A method for solving the discrete logarithm problem on anomalous curves is described in detail in non-patent document 3, pp 88 to 91, and a description of the method is therefore omitted here.

3.6 Operation of Addition Module 601

Figure 19:
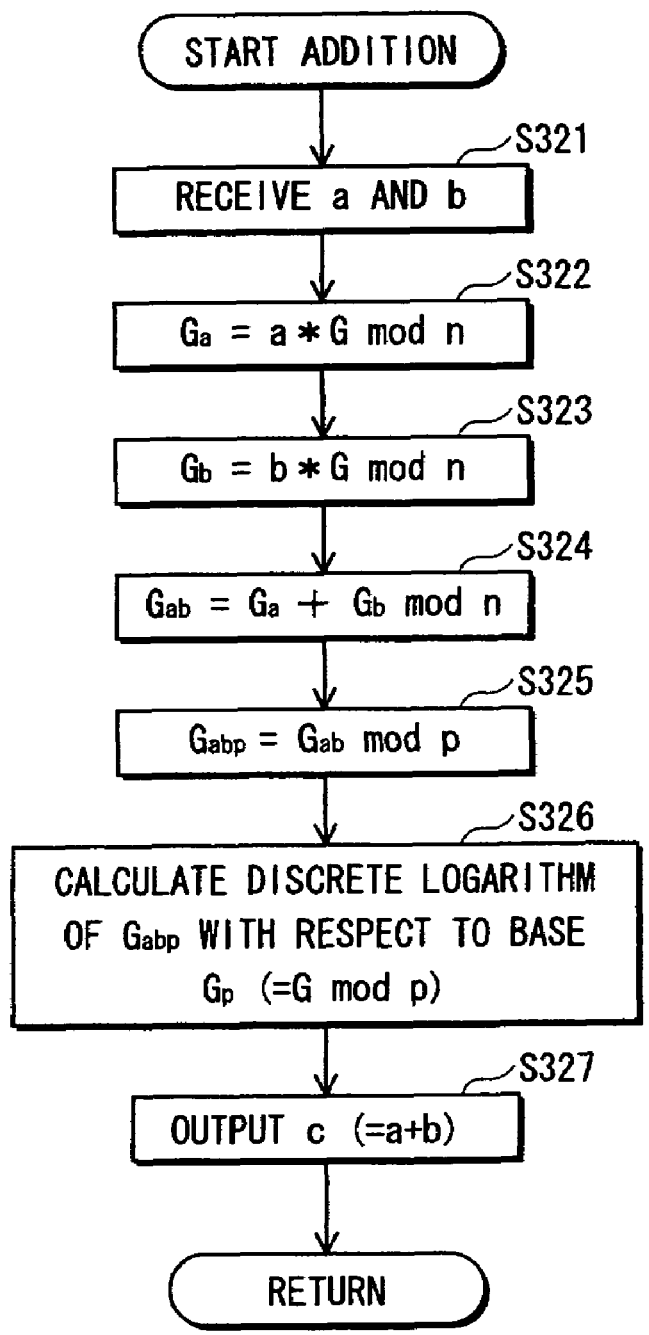
FIG. 19 is a flow-chart showing an adding operation by the addition module 601.

The operation of the addition module 601 is described with reference to the flow-chart shown in FIG. 19.

The scalar multiplication unit 622 receives the input data a and b from the caller program (Step S321), and calculates $$G_a = a*G \bmod n \text{ and}$$

$$G_b = b*G \bmod n$$

for the received input data a and b using the n, A, B and G stored in the parameter storage unit 621 (Steps S322 and S323).

Next the elliptic curve addition unit 624 calculates $$G_{ab} = G_a + G_b \bmod n \text{ (Step S324)}.$$

Next, the reduction unit 626 calculates $$G_a = G_b \bmod p \text{ (Step S325)},$$

the discrete logarithm calculation unit 627 calculates the discrete logarithm c of $G_{abp}$ with respect to base G mod p (Step S326), and subsequently outputs c to the caller program (Step S327).

3.7 Addition Module 601 Operation Verification

It is verified below that the addition module 601 outputs the data a+b for the input data a, b.

$$G_a = a*G \bmod n \text{ and}$$

$$G_b = b*G \bmod n$$

are calculated for a and b in the conversion unit 611, and $G_{ab} = G_a + G_b \bmod n$ is calculated in the main calculation unit 612.

It is obvious at this point that Gab=(a+B)*G is satisfied.

The conversion unit 613 first calculates $$G_{abp} = G_{ab} \bmod p,$$

and then the discrete logarithm c of $G_{apb}$ with respect to G mod p. In other words, c is calculated to satisfy $G_{apb} = c*G$ mod p.

Consequently, c=a+b mod p. Moreover, a<p/2 and b<p/2 gives a+b<p. Therefore, given the input data a and b, the addition module 601 outputs the result of a+b.

3.8 Effects of the Addition Module 601

The addition module 601 converts the values in a similar way to the addition module 243 and the addition module 501. Provided that the conversion unit 611 and the inverse conversion unit 613 are difficult to analyze, this conversion makes it difficult to infer the unconverted values from the converted values.

The addition module 601 performs elliptic curve addition in the main calculation unit 612. It is difficult infer from the elliptic curve operation that the addition module 601 is in fact realizing an addition.

Consequently, the addition module 601 has the effect of making it possible to conceal not only the input values for the addition, but also the operation of addition itself.

3.9 Notes

In the addition module 601, scalar multiplications in the group E(GF(p))×E(GF(g)) formed by the elliptic curve over Z/nZ are performed by the conversion unit, and the discrete logarithm problem in the subgroup E(GF(p)) is solved by the inverse conversion unit.

In the case where a person attempting to analyze the program discovers that that a power calculation is being performed in the in the conversion unit but does not know p and q, only the inverse conversion unit is difficult to analyze.

However, if n is large enough to make the prime factorization difficult (of the order of 1024 bits, for instance), it is difficult to obtain p and q since to do so would require a prime factorization of n. Without obtaining p and q, it is difficult to solve the discrete logarithm problem in the group E(GF(p))× E(GF(q)) formed by the elliptic curve over Z/nZ.

Generally, when the size (number of elements) of a group is large (of the order pf a 1024 bits for instance), it is difficult to solve the discrete logarithm problem in the group. In the case of the addition module 601, if p is known, the discrete logarithm problem in the elliptic curve group is easily solvable by inverse conversion in the inverse conversion unit. The conversions performed by the addition module 601 differ from those of the first embodiment in that they make use of the fact that inverse conversion is easy if p is known but difficult if p is unknown.

OTHER EXEMPLARY MODIFICATIONS

Although the present invention has been described based on the above embodiments, the present invention is not limited to these embodiments. The following modifications are also included in the present invention.

(1) The addition modules 243, 501, and 601 are described as performing the addition of two non-negative integers, but the addition modules may perform the addition of three or more non-negative integers. In this case, the conversion unit of the addition module in question converts each of the non-negative numbers. Next, in the case of addition modules 243 and 501, the main calculating unit performs a multiplication using the results of the conversions. In the case of the addition module 601, the main calculating unit performs elliptic curve addition using the results of the conversions.

(2) The addition modules 243, 501, and 601 were only described as being used in a key addition section of the decryption control module 241, but each addition module may be used in other addition sections of the decryption control module.

(3) In the First Embodiment, the addition module is used in the decryption control module 241, but the addition module may be used in the encryption control module 141, in another encryption program, or in a signature generating program. This invention can be similarly applied to any information processing operation that makes use of addition.

In the addition module 243, 501 and 601, an integer residue ring multiplicative group and a group over an elliptic curve were used, but other types of group may be used.

Note also that although the integers were converted by performing power operations in addition modules 243 and 501, and by performing elliptic curve scalar multiplication in the addition module 601, other group-related power operations may be used to convert the integers.

Note that the power operation refers to a basic group operation, such as a multiplication in an integer residue ring or an elliptic curve addition in a group over an elliptic curve, that is repeated a number of times.

Thus, the power operation in an multiplicative group of an integer residue ring is an exponentiation, and the power operation in the group over the elliptic curve is an elliptic curve scalar multiplication.

In the addition module 501, the discrete logarithm problem is solved in the multiplicative group of the integer residue ring $z/p^2Z$, which is a subgroup of the multiplicative group of the integer residue ring Z/nZ. When a different group is used, a conversion unit similar to that of the addition module 501 may solve the discrete logarithm problem in a subgroup of the different group.

(5) In the addition module 243, g was the primitive root in $p_i$ (i=1, 2, ..., k), but g need not be the primitive root.

When g is not the primitive root, let $L=m_1 \times m_2 \times ... \times m_k$ for $m_i$ where $g^{mi}=1 \mod p_i$ ($m_i>0$).

(6) Specifically, the above-described devices are computer systems each constructed from a microprocessor, ROM, RAM, a hard disk unit, a display unit, a keyboard, a mouse, and the like. A program is recorded in the RAM or in the hard disk unit. The program is composed of a combination of instruction codes representing instructions to the computer. Each device fulfills its function as a result of the microprocessor operating in accordance with the program. In short, the microprocessor reads the instruction codes in the program one at a time, decodes the read instruction codes, and operates in accordance with the results.

(7) Some or all of the components constituting the above devices may be constructed using a single system LSI (Large Scale Integration). System LSI is super-multifunctional LSI constructed using a plurality of components integrated on a single chip. Specifically, it is a computer system constructed to include a microprocessor, ROM, RAM, and the like. The RAM stores a program therein. The system LSI achieves its function as a result of the microprocessor operating in accordance with the program.

(8) Some or all of the components constituting the above devices may be constructed using detachable IC cards or unit modules. The IC card or module is a computer system constructed from a microprocessor, ROM, RAM, and the like. The IC card or module may include the super multifunctional LSI. The IC card or module fulfills its function as a result of the microprocessor operating in accordance with a program. The IC card or module may be tamper resistant.

(9) The present invention may be the methods described above. Moreover, it may be programs that realize these methods using a computer.

Moreover, the present invention may be a computer-readable recording medium having the program recorded thereon, examples of which include flexible disk, hard disk, CD-ROM, MO, DVD, DVD-ROM, DVD-RAM, BD (Blu-ray Disc), and semi-conductor memory etc. Alternatively, the present invention may be the programs recorded on any of these recording media.

Further, the present invention may be the program broadcast or transmitted via a network or the like, typical examples of which include a telecommunications line, a wireless or cable communications line, and the Internet.

Further, the present invention may be a computer system provided with a microprocessor and a memory, in which the memory stores the program and the microprocessor operates in accordance with the program.

Further, the program may be implemented using an independent computer system by transferring the program recorded on the recording medium, or by transferring the program via the network or the like.

(10) The present invention may be any combination of the above embodiments and modifications.

(11) As described above, rather than simply enabling concealment of the values that are used in an operation, the present invention further enables concealment of the operation itself. It can therefore be usefully included in scrambling software and in devices such as IC cards.

The devices, methods and programs which of the present invention can be used administratively as well as repeatedly, in all industries where it is necessary to manipulate information safely and reliably. The devices, methods, and programs that constitute the present invention can be manufactured and retailed repeatedly, in manufacturing industries producing electronic devices.

The invention claimed is:

1. A computer system for securely and reliably manipulating target information by adding two or more integers, the computer system comprising:

a memory unit operable to store a program composed of a plurality of instructions;

a processor operable to (i) fetch each instruction from the program stored in the memory unit, (ii) decode and execute each fetched instruction, and (iii) securely and reliably manipulate the target information by executing security processing on the target information;

a conversion unit operable to control, according to an instruction of the program, the processor to first generate elements belonging to a group G by implementing a power operation which performs exponentiation to each of the two or more integers, the group G being based on an integer residue ring Z/nZ, where (i) $n=p_1^{m1} \times p_2^{m2} \times \ldots \times p_k^{mk}$, (ii) each of $m_1, m_2, \ldots, m_k$ is an integer being no less than one, (iii) k is an integer being greater than one, (iv) each of $p_1, p_2, \ldots, p_k$ denotes mutually differing prime numbers, (v) Z denotes an integer ring, (vi) the integer residue ring Z/nZ is composed of values that are congruent modulo m, and (vii) × denotes multiplication;

a multiplication unit operable to control, according to an instruction of the program, the processor to second generate an operation value by implementing a multiplication using all of the elements first generated by the processor according to the control of the conversion unit; and, an inverse conversion unit operable to control, according to an instruction of the program, the processor to third generate a sum value of the two or more integers by implementing, in the group G or a proper subgroup S of the group G, an inverse power operation on the operation value second generated by the processor according to the control of the multiplication unit, the inverse power operation including solving a discrete logarithm in the subgroup S, wherein:

the processor executes the security processing on the target information according to the control of the conversion unit, the multiplication unit, and the inverse conversion unit to add two or more integers;

the security processing includes (i) encrypting or decrypting the target information based on key information, the encrypting or decrypting being accomplished by adding the key information or second key information obtained from the key information to the target information or second target information obtained from the target information, the adding being executed according to the control of the conversion unit, the multiplication unit, and the inverse conversion unit and (ii) implementing a digital signature or digital signature verification on the target information based on the key information, the implementation of the digital signature or the digital signature verification being accomplished by adding the key information or second key information obtained from the key information to the target information or second target information obtained from the target information, the adding being executed according to the control of the conversion unit, the multiplication unit, and the inverse conversion unit.

2. The computer system of claim 1, wherein the inverse conversion unit is operable to control, according to an instruction of the program, the processor use a Chinese Remainder Theorem to solve a discrete logarithm problem in each multiplicative group $Z/Zp_1^{m1}, Z/Zp_2^{m2}, \ldots, Z/Zp_k^{mk}$.

3. The computer system of claim 1, wherein:
the subgroup S is an anomalous elliptic curve group;
the multiplication unit is operable to control, according to an instruction of the program, the processor to implement a multiplication on the elliptic curve using each of the two or more integers; and
the computer system further includes an addition unit operable to control, according to an instruction of the program, the processor to implement an addition of each element on the elliptic curve.

4. The computer system of claim 1, wherein:
the group G is a direct product of two anomalous elliptic curve groups resulting in an elliptical curve;
the multiplication unit is operable to control, according to an instruction of the program, the processor to implement a multiplication on the elliptic curve using each of the two or more integers; and
the computer system further includes an addition unit operable to control, according to an instruction of the program, the processor to implement an addition of generated elements on the elliptic curve.

5. The computer system of claim 1, wherein the inverse conversion unit is operable to control, according to an instruction of the program, the processor to (i) store a plurality of exponents, each exponent being in correspondence with a value raised to a power using a respective exponent, and (ii) find the inverse of the power operation by searching each correspondence between an exponent and a corresponding value raised to a power using a respective exponent.

6. The computer system of claim 1, wherein the inverse conversion unit is operable to control the processor reduce each element belonging to the group G to an element belonging to the subgroup S.

7. The computer system of claim 1, wherein the encrypting is based on a shared key encryption algorithm, and the decrypting is based on a shared key decryption algorithm.

8. The computer system of claim 1, wherein the processor and the memory are integrated on an IC card.

9. A method of using a computer system including a memory unit and a processor to securely and reliably manipulate target information by adding two or more integers, the method of using the computer system comprising:

storing, in the memory unit, a program composed of a plurality of instructions;

controlling, according to an instruction of the program, the processor to first generate elements belonging to a group G by implementing a power operation which performs exponentiation to each of the two or more integers, the group G being based on an integer residue ring Z/nZ, where (i) $n=p_1^{m1} \times p_2^{m2} \times \ldots \times p_k^{mk}$, (ii) each of $m_1, m_2, \ldots, m_k$ is an integer being no less than one, (iii) k is an integer being greater than one, (iv) each of $p_1, p_2, \ldots, p_k$ denotes mutually differing prime numbers, (v) Z denotes an integer ring, (vi) the integer residue ring Z/nZ is composed of values that are congruent modulo m, and (vii) × denotes multiplication;

controlling, according to an instruction of the program, the processor to second generate an operation value by implementing a multiplication using all of the elements generated by the controlling of the processor to first generate elements;

controlling, according to an instruction of the program, the processor to third generate a sum value of the two or more integers by implementing, in the group G or a proper subgroup S of the group G, an inverse power operation on the operation value generated by the controlling of the processor to second generate the operation value, the inverse power operation including solving a discrete logarithm in the subgroup S; and securely and reliably manipulating target information by controlling the processor to execute security processing on the target information according to (i) the controlling of the processor to first generate elements, (ii) the controlling of the processor to second generate the operation value, and (iii) the controlling of the processor to third generate the sum value, wherein the security processing includes (i) encrypting or decrypting the target information based on key information, the encrypting or decrypting being accomplished by adding the key information or second key information obtained from the key information to the target information or second target information obtained from the target information, and (ii) implementing a digital signature or digital signature verification on the target information, the implementing of the digital signature or the digital signature verification being accomplished by adding the key information or second key information obtained from the key information to the target information or second target information obtained from the target information.

10. A computer-readable storage medium having a computer program stored thereon, the computer program for securely and reliably manipulating target information by adding two or more integers, the computer program causing a computer including a memory unit and a processor to execute a method comprising:

storing, in the memory unit, a program composed of a plurality of instructions;

controlling, according to an instruction of the program, the processor to first generate elements belonging to a group G by implementing a power operation which performs exponentiation to each of the two or more integers, the group G being based on an integer residue ring Z/nZ, where (i) $n = p_1^{m1} \times p_2^{m2} \times \ldots \times p_k^{mk}$, each of $m_1, m_2, \ldots, m_k$ is an integer being no less than one, (iii) k is an integer being greater than one, (iv) each of $p_1, p_2, \ldots, p_k$ denotes mutually differing prime numbers, (v) Z denotes an integer ring, (vi) the integer residue ring Z/nZ is composed of values that are congruent modulo m, and (vii) × denotes multiplication;

controlling, according to an instruction of the program, the processor to second generate an operation value by implementing a multiplication using all of the elements generated by the controlling of the processor to first generate elements;

controlling, according to an instruction of the program, the processor to third generate a sum value of the two or more integers by implementing, in the group G or a proper subgroup S of the group G, an inverse power operation on the operation value generated by the controlling of the processor to second generate the operation value, the inverse power operation including solving a discrete logarithm in the subgroup S; and securely and reliably manipulating target information by controlling the processor to execute security processing on the target information according to (i) the controlling of the processor to first generate elements, (ii) the controlling of the processor to second generate the operation value, and (iii) the controlling of the processor to third generate the sum value, wherein the security processing includes (i) encrypting or decrypting the target information based on key information, the encrypting or decrypting being accomplished by adding the key information or second key information obtained from the key information to the target information or second target information obtained from the target information, and (ii) implementing a digital signature or digital signature verification on the target information, the implementing of the digital signature or the digital signature verification being accomplished by adding the key information or second key information obtained from the key information to the target information or second target information obtained from the target information.

* * * * *